United States Patent
Han et al.

(10) Patent No.: US 9,971,195 B2
(45) Date of Patent: May 15, 2018

(54) OPTICAL LENS AND DISPLAY DEVICE INCLUDING THE SAME

(71) Applicant: LG ELECTRONICS INC., Seoul (KR)

(72) Inventors: Jongho Han, Seoul (KR); Uihyung Lee, Seoul (KR); Juyoung Joung, Seoul (KR); Wondo Kee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 14/982,674

(22) Filed: Dec. 29, 2015

(65) Prior Publication Data

US 2016/0187726 A1 Jun. 30, 2016

(30) Foreign Application Priority Data

Dec. 29, 2014 (KR) .................. 10-2014-0192700

(51) Int. Cl.
*G02F 1/1335* (2006.01)
*F21V 5/04* (2006.01)
*G02B 19/00* (2006.01)

(52) U.S. Cl.
CPC ........ *G02F 1/133606* (2013.01); *F21V 5/045* (2013.01); *G02B 19/0028* (2013.01);
(Continued)

(58) Field of Classification Search
CPC ... G02F 1/133606; G02F 2001/133607; F21V 5/045; F21V 5/046; G02B 19/0028; G02B 19/0061; G02B 19/0071
See application file for complete search history.

(56) References Cited

U.S. PATENT DOCUMENTS

| | | | |
|---|---|---|---|
| 2004/0233665 A1* | 11/2004 | West | G02F 1/133603 362/245 |
| 2007/0047232 A1* | 3/2007 | Kim | F21V 5/04 362/305 |
| 2013/0088857 A1* | 4/2013 | Lee | G02B 19/0028 362/97.1 |

FOREIGN PATENT DOCUMENTS

| | | |
|---|---|---|
| CN | 103629568 | 3/2014 |
| CN | 103890647 | 6/2014 |

(Continued)

OTHER PUBLICATIONS

European Search Report dated Aug. 5, 2016 issued in Application No. 15003690.3.

(Continued)

*Primary Examiner* — Nathanael R Briggs
(74) *Attorney, Agent, or Firm* — KED & Associates, LLP

(57) ABSTRACT

An optical lens and a display device including the same are provided. An optical lens includes a first surface having a circular cross-sectional shape, a second surface opposite to the first surface, and a third surface configured to connect the first surface and the second surface. The third surface includes a straight surface extending from a boundary of the first surface and a first curved surface extending from the straight surface to the second surface. The straight surface and the first curved surface extending in a path between the first surface and the second surface. The second surface includes a concave recess recessing in a direction of the first surface and the concave recess includes a second curved surface. Light that has passed through the second concave surface changes a path as the light passes through the first curved surface such that light path can be effectively controlled.

19 Claims, 33 Drawing Sheets

(52) U.S. Cl.
CPC ..... *G02B 19/0061* (2013.01); *G02B 19/0071* (2013.01); *G02F 1/133603* (2013.01); *G02F 2001/133607* (2013.01)

(56) References Cited

FOREIGN PATENT DOCUMENTS

| | | | | |
|---|---|---|---|---|
| CN | 103912843 | | 7/2014 | |
| CN | 103912843 A | * | 7/2014 | ............. G02B 13/06 |
| CN | 203686878 | | 7/2014 | |
| EP | 1 717 627 | | 11/2006 | |
| EP | 2 378 338 | | 10/2011 | |
| EP | 2 450 618 | | 5/2012 | |
| EP | 2 704 222 | | 3/2014 | |

OTHER PUBLICATIONS

European Search Report dated May 2, 2016 issued in Application No. 15003690.3.
Chinese Office Action dated Apr. 5, 2017 issued in Application No. 201511036209.4 (with English Translation).

* cited by examiner

FIG. 11
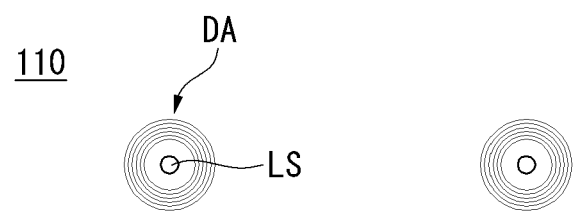
(a)
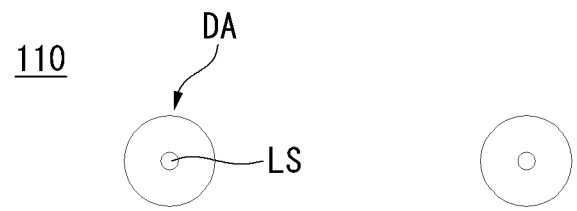
(b)
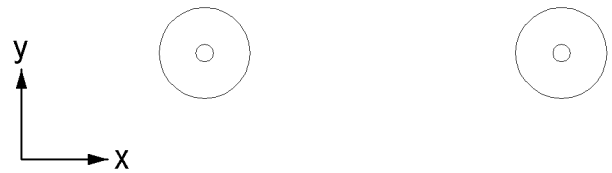

FIG. 14
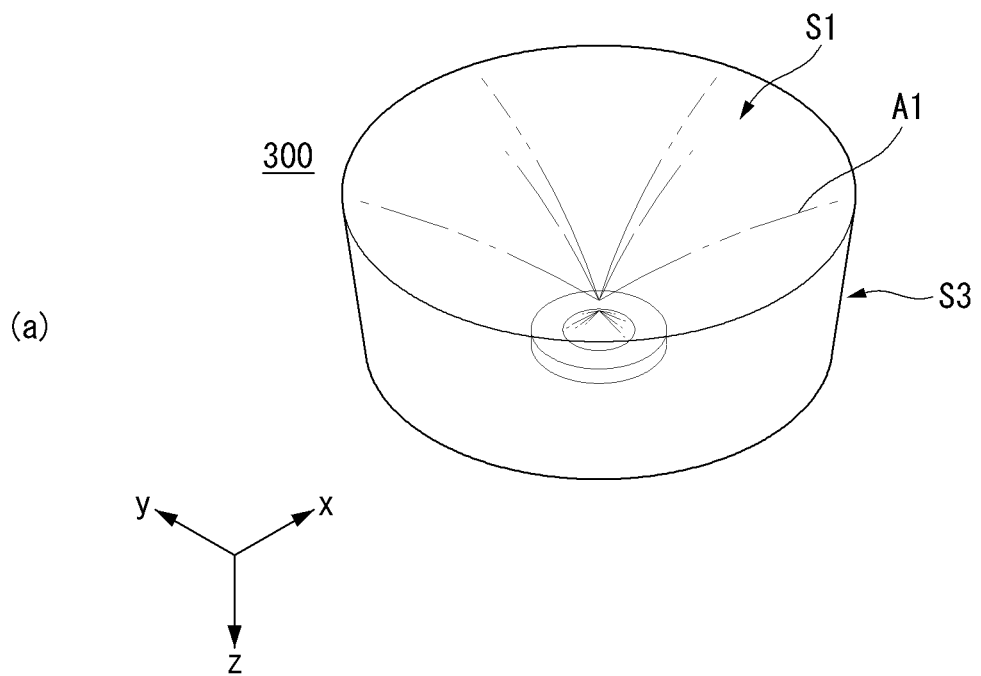
(a)
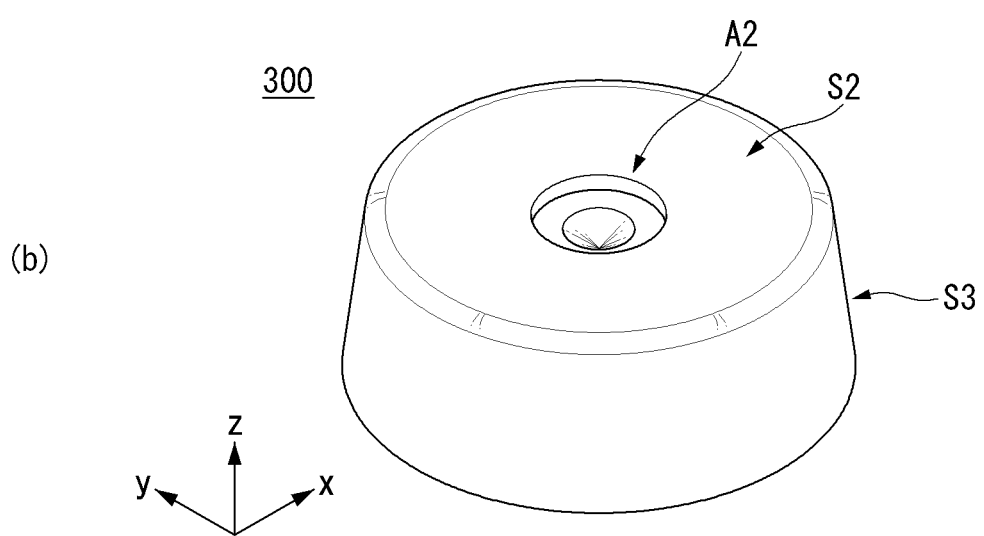
(b)

FIG. 32
(a)
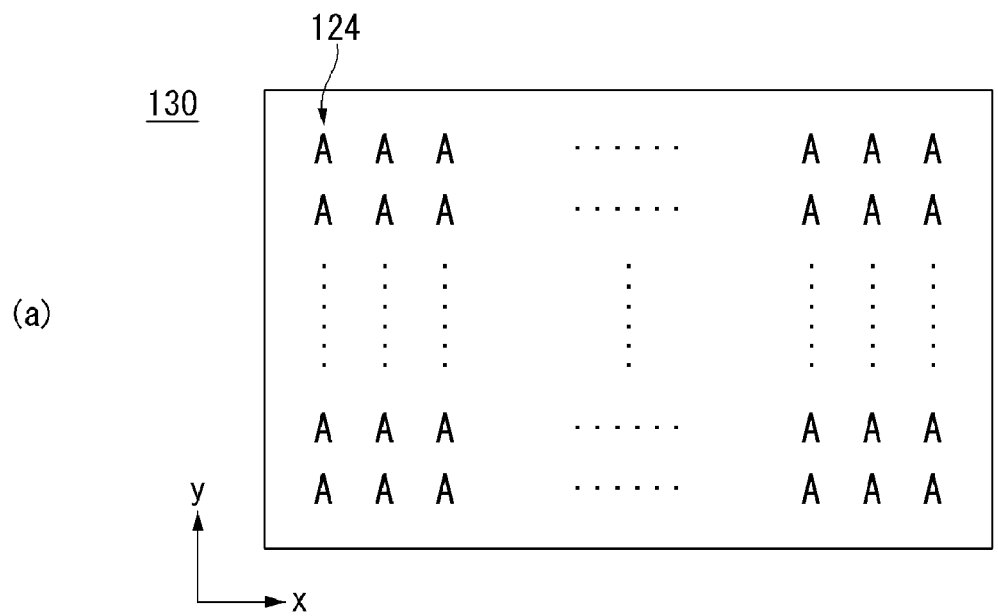
(b)
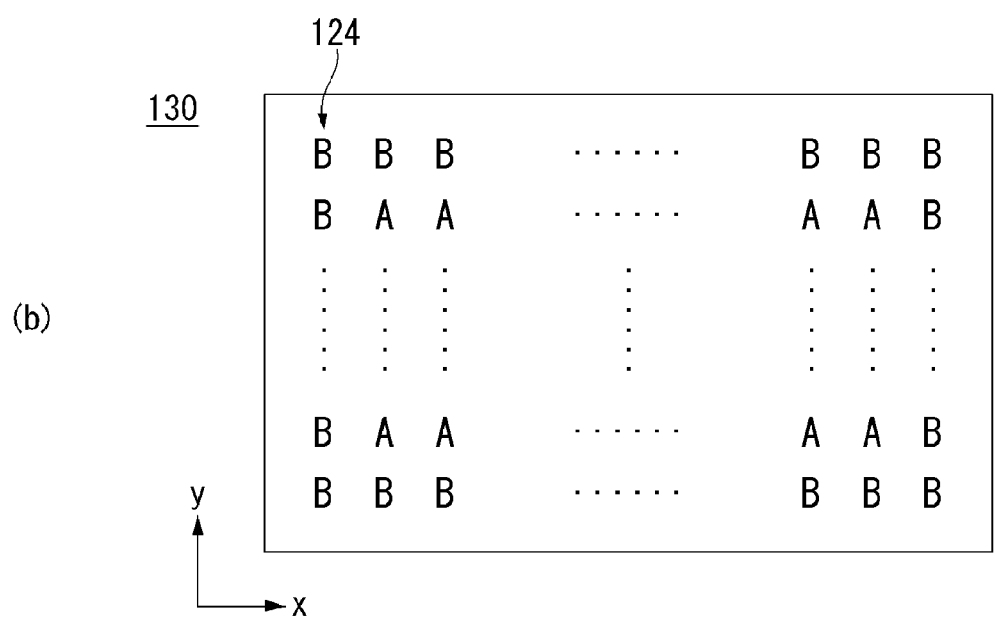

FIG. 33
(a)
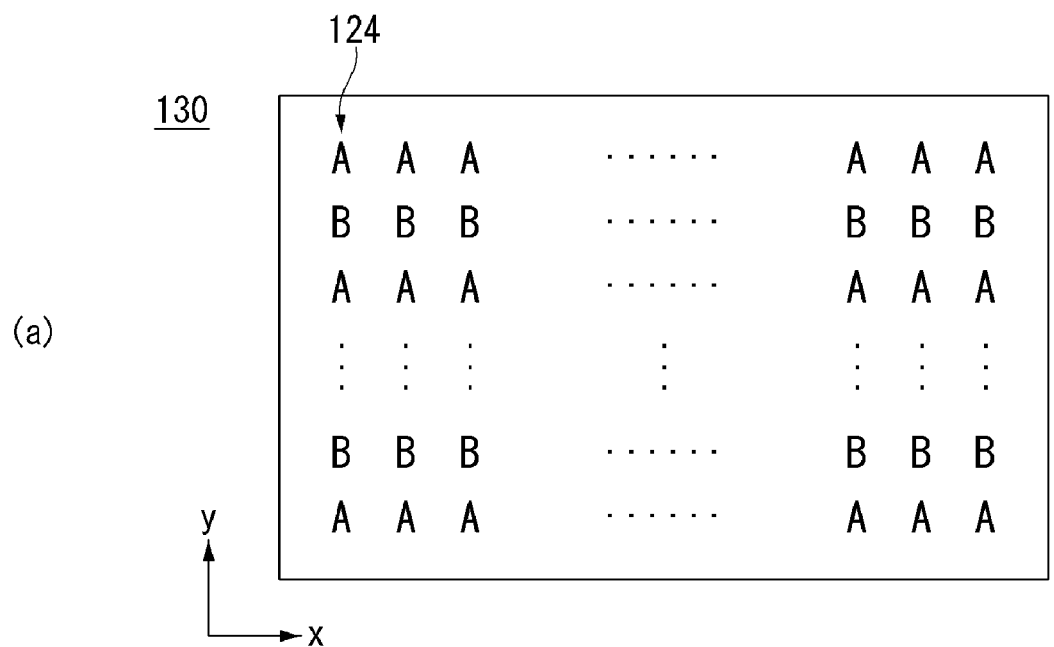
(b)
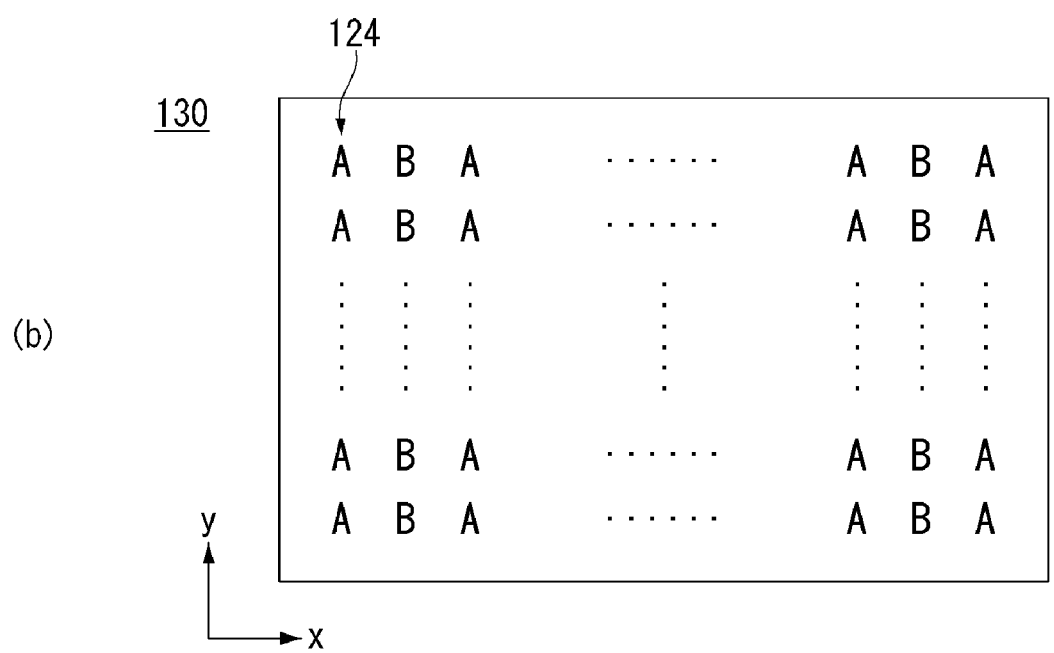

OPTICAL LENS AND DISPLAY DEVICE INCLUDING THE SAME

CROSS-REFERENCE TO RELATED APPLICATION

This application claims priority under 35 U.S.C. §119 to Korean Application No. 10-2014-0192700 filed on Dec. 29, 2014, whose entire disclosure is hereby incorporated by reference.

BACKGROUND

1. Field

The present disclosure relates to an optical lens and a display device including the same.

2. Background

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

A liquid crystal panel of the LCD includes a liquid crystal layer and an opposing thin film transistor (TFT) substrate and color filter substrate with a liquid crystal layer interposed therebetween and may display an image using light provided from a backlight unit.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 11 and 12 are diagrams illustrating a difference according to a lens constituting a light assembly;

FIGS. 13 and 14 are views illustrating a lens according to an exemplary embodiment of the present disclosure;

FIGS. 32 and 33 are diagrams illustrating a disposition of a light assembly according to other exemplary embodiments of the present disclosure.

DETAILED DESCRIPTION

Hereinafter, as a display panel, a liquid crystal panel is exemplified, but a display panel that can apply to the present disclosure is not limited to the liquid crystal panel but may be a Plasma Display Panel (PDP), a Field Emission Display (FED), and an Organic Light Emitting Display (OLED). Further, a display panel 110 may include a First Long Side (LS1), a Second Long Side (LS2) opposite to the LS1, a First Short Side (SS1) adjacent to the LS1 and the LS2, and a Second Short Side (SS2) opposite to the SS1.

The SS1 may be referred to as a first side area, the SS2 may be referred to as a second side area opposite to the first side area, the LS1 may be referred to as a third side area adjacent to the first side area and the second side area and located between the first side area and the second side area, and the LS2 may be referred to as a fourth side area adjacent to the first side area and the second side area, located between the first side area and the second side area, and opposite to the third side area. For convenience of description, it is described that a length of the LS1 and LS2 is longer than that of the SS1 and SS2, but a length of the LS1 and LS2 may be approximately the same as that of the SS1 and SS2.

A First Direction (DR1) may be a direction parallel to the LS1 and LS2 of the display panel 100, and a Second Direction (DR2) may be a direction parallel to the SS1 and SS2 of the display panel 110. A Third Direction (DR3) may be a direction vertical to the DR1 and/or the DR2. The DR1 and the DR2 may be referred to as a horizontal direction. Further, the DR3 may be referred to as a vertical direction.

Figure 1:
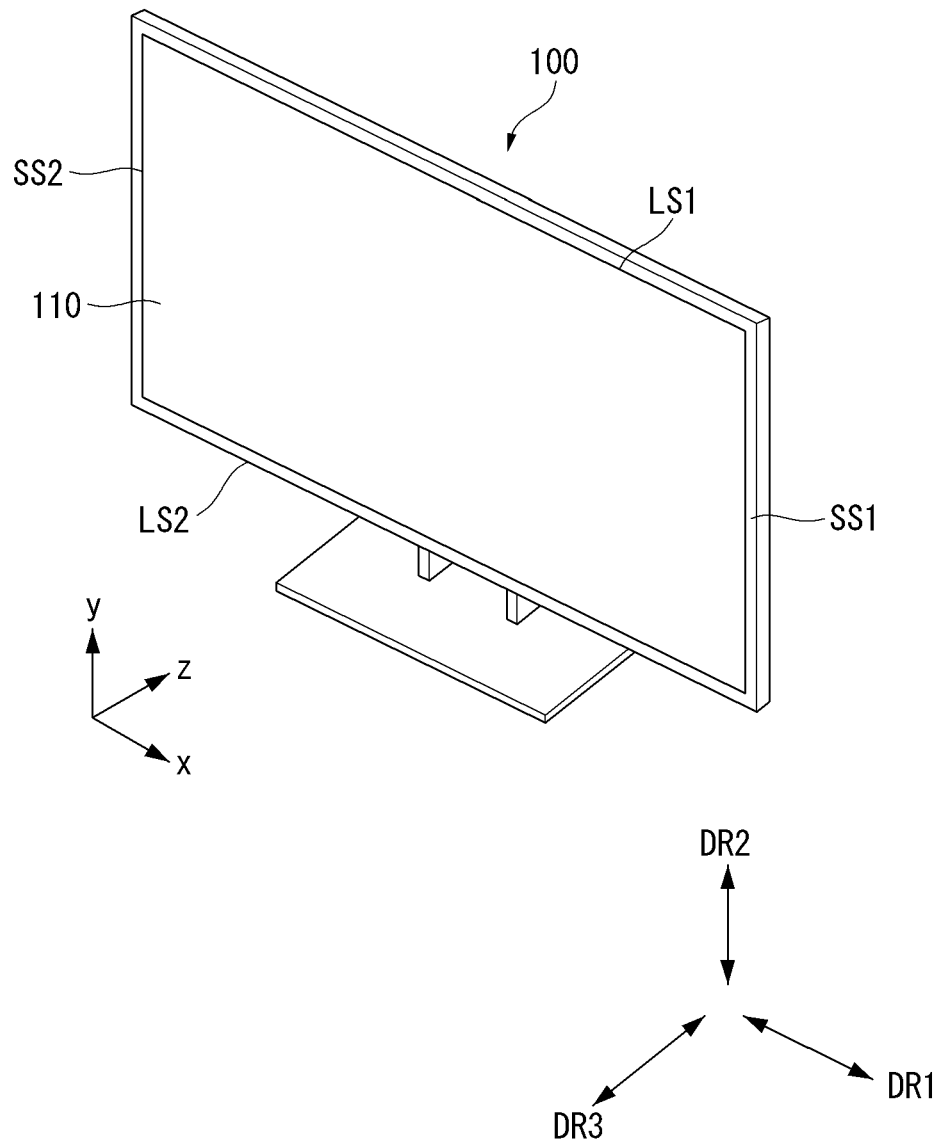
FIGS. 1 and 2 are perspective views illustrating a display device according to an exemplary embodiment of the present disclosure.
Figure 2:
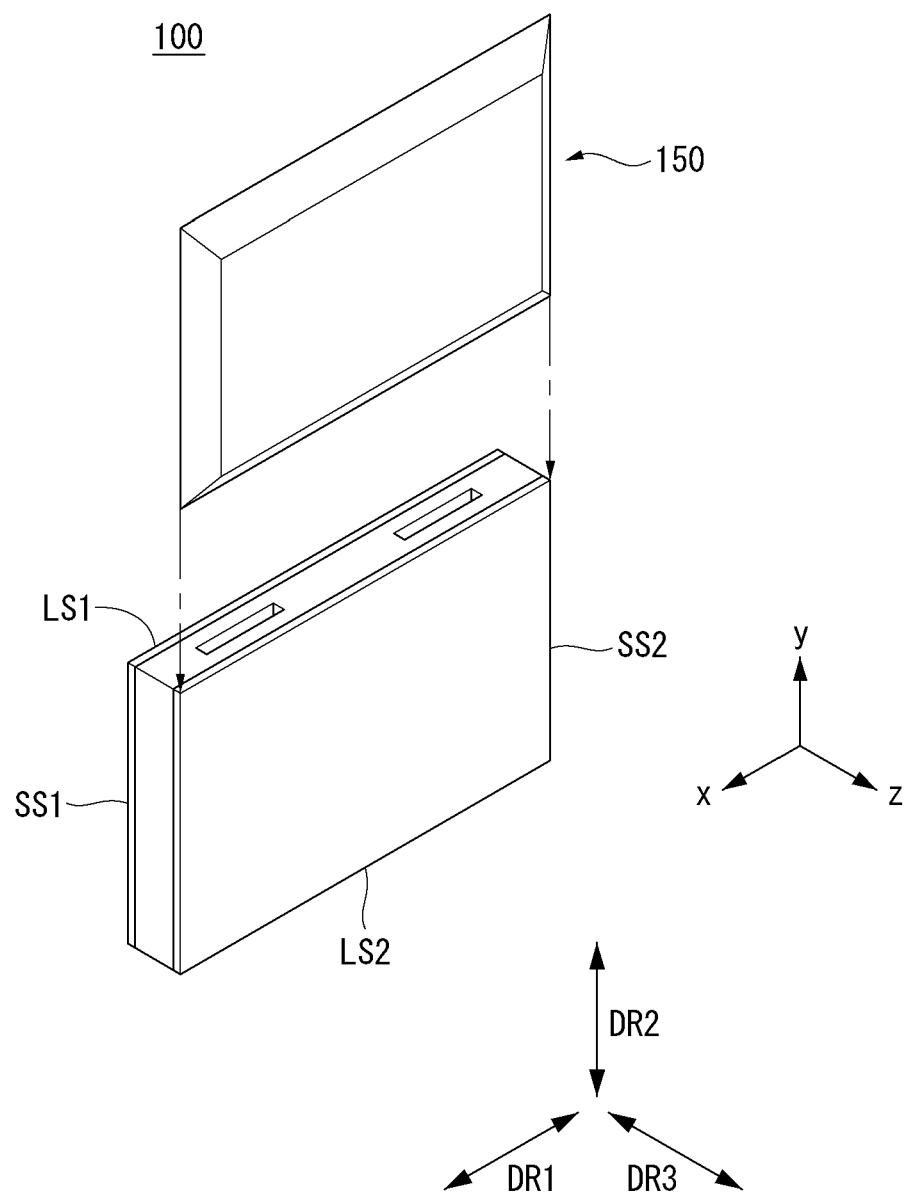

FIGS. 1 and 2 are perspective views illustrating a display device according to an exemplary embodiment of the present disclosure. A display device 100 according to an exemplary embodiment of the present disclosure may include a display panel 110 and a back cover 150 of the rear side of the display panel 110.

The back cover 150 may be connected to the display panel 110 with a sliding method in a direction from the LS1 toward the LS2, i.e., in the DR2. In other words, the back cover 150 may be inserted with a sliding method from the SS1 of the display panel 110, the SS2 corresponding to the SS1, and the LS1 adjacent to the SS1 and SS2 and located between the SS1 and the SS2. In order to connect the back cover 150 to the display panel 110 with a sliding method, the back cover 150 and/or other structures adjacent thereto may include a protruding portion, a sliding portion, and a coupler.

FIGS. 3 to 7 are views illustrating a configuration of a display device according to an exemplary embodiment of the present disclosure.

Figure 3:
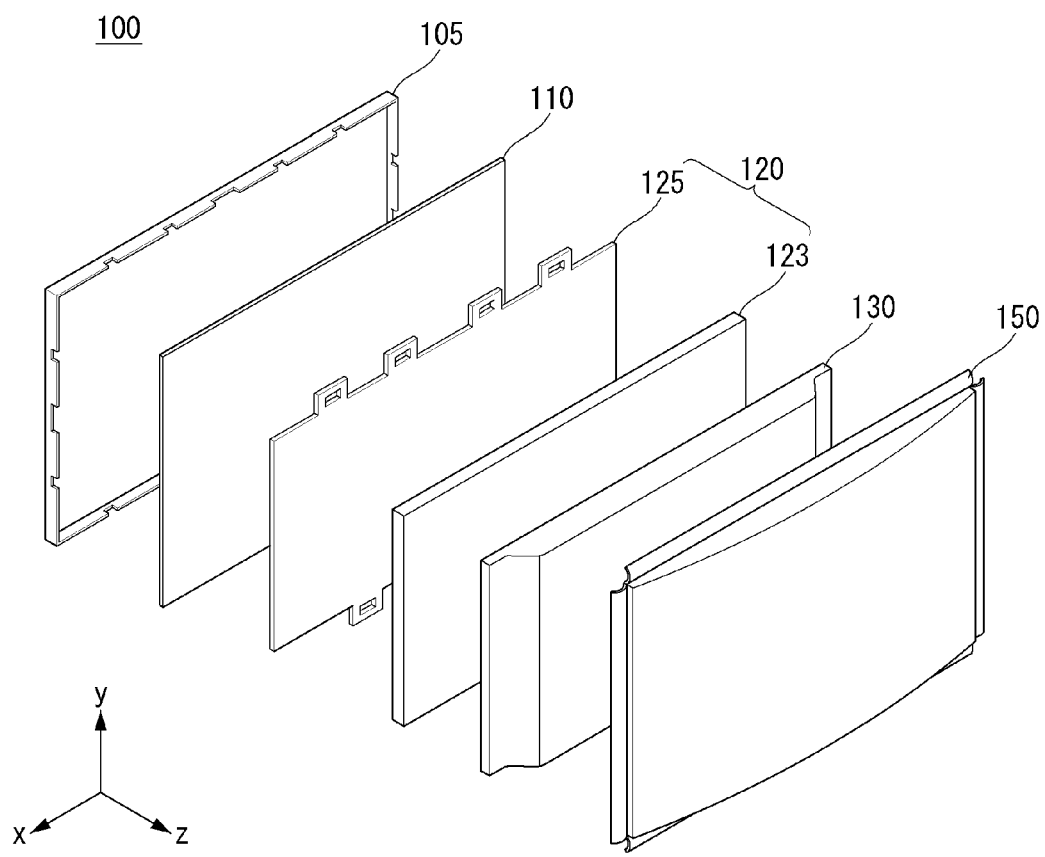
FIGS. 3 to 7 are views illustrating a configuration of a display device according to an exemplary embodiment of the present disclosure.

As shown in FIG. 3, the display device 100 according to an exemplary embodiment of the present disclosure may include a front cover 105, a display panel 110, a backlight unit 120, a frame 130, and a back cover 150.

The front cover 105 may cover at least a partial area of a front surface and a side surface of the display panel 110. The front cover 105 may have a quadrangular frame shape having the hollow center. Because the front cover 105 has the hollow center, an image of the display panel 110 may be displayed to the outside.

The front cover 105 may be divided into a front surface cover and a side surface cover. That is, the front cover 105 may be divided into a front surface cover located at the front surface side of the display panel 110 and a side surface cover located at the side surface side of the display panel 110. The front surface cover and the side surface cover may be separately formed. Any one side of the front surface cover and the side surface cover may be omitted. For example, for an object of an enhanced design, the front surface cover may not exist but only a side surface cover may exist.

The display panel 110 is provided at a front surface of the display device 100 and may display an image. The display panel 110 may divide an image into a plurality of pixels to output an image by adjusting color, brightness, and chroma per pixel. The display panel 110 may be divided into an active area that displays an image and an inactive area that does not display an image. The display panel 110 may include an opposing front substrate and rear substrate with a liquid crystal layer interposed therebetween.

The front substrate may include a plurality of pixels consisting of red (R), green (G), and blue (B) subpixels. The front substrate may generate an image corresponding to a color of red, green, or blue according to a control signal.

The rear substrate may include switching elements. The rear substrate may switch a pixel electrode. For example, the pixel electrode may change molecule arrangement of a liquid crystal layer according to a control signal applied from the outside. The liquid crystal layer may include a plurality of liquid crystal molecules. The liquid crystal molecules may change arrangement to correspond to a voltage difference occurring between a pixel electrode and a common electrode. The liquid crystal layer may transfer light provided from the backlight unit 120 to the front substrate.

The backlight unit 120 may be located at the rear surface side of the display panel 110. The backlight unit 120 may include a plurality of light sources. A light source of the backlight unit 120 may be disposed in a direct type or an edge type. When the backlight unit 120 is an edge backlight unit 120, a light guide panel may be further included.

The backlight unit 120 may be coupled to the front surface side of the frame 130. For example, a plurality of light sources may be disposed at the front side of the frame 130, and this may be referred to as a direct type backlight unit. The backlight unit 120 may be driven with an entire driving method or a partial driving method such as local dimming and impulsive. The backlight unit 120 may include an optical sheet 125 and an optical layer 123.

The optical sheet 125 may enable light of a light source to be uniformly transferred to the display panel 110. The optical sheet 125 may be formed with a plurality of layers. For example, the optical sheet 125 may include at least one prism sheet and/or at least one diffusion sheet.

In the optical sheet 125, at least one coupler 125d may exist. The coupler 125d may be coupled to the front cover 105 and/or the back cover 150. That is, the coupler 125d may be directly coupled to the front cover 105 and/or the back cover 150. Alternatively, the coupler 125d may be coupled to a structure coupled onto the front cover 105 and/or the back cover 150. That is, the coupler 125d may be indirectly coupled to the front cover 105 and/or the back cover 150.

The optical layer 123 may include a light source. A detailed configuration of the optical layer 123 will be described in a corresponding portion.

The frame 130 may perform a function of supporting constituent elements of the display device 100. For example, a configuration of the backlight unit 120 may be coupled to the frame 130. The frame 130 may be made of a metal material such as an aluminum alloy.

The back cover 150 may be located at a rear surface of the display device 100. The back cover 150 may protect an internal configuration from the outside. At least a portion of the back cover 150 may be coupled to the frame 130 and/or the front cover 105. The back cover 150 may be an injection material made of a resin material.

Figure 4:
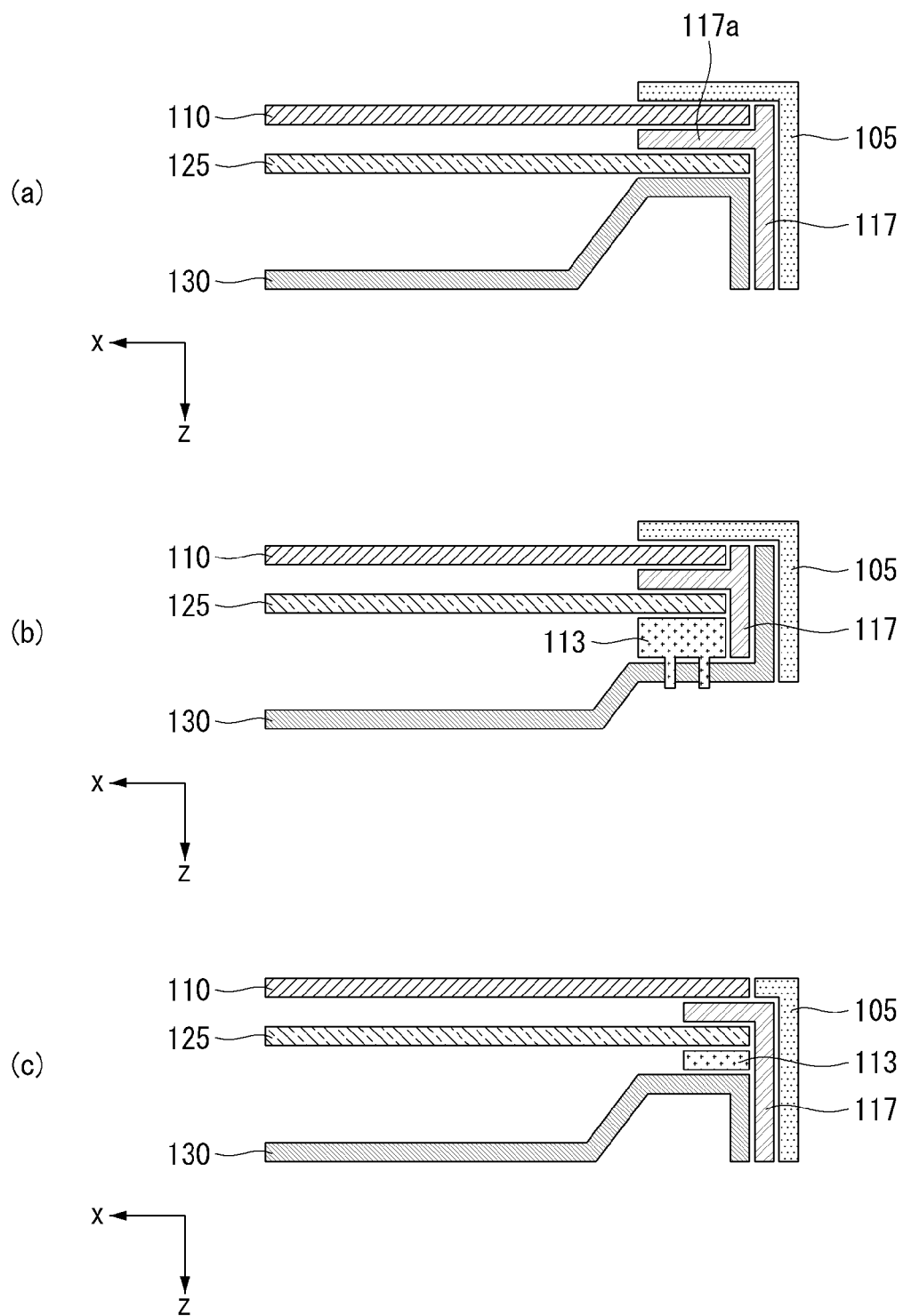

FIG. 4 is a diagram illustrating a configuration of the optical sheet 125. As shown in FIG. 4A, in an upper portion of the frame 130, the optical sheet 125 may be located. The optical sheet 125 may be coupled to the frame 130 at an edge of the frame 130. The optical sheet 125 may be directly received at an edge of the frame 130. That is, the optical sheet 125 may be supported by the frame 130. An upper surface of an edge of the optical sheet 125 may be enclosed by a first guide panel 117. For example, the optical sheet 125 may be located between an edge of the frame 130 and a flange 117a of the first guide panel 117.

At the front surface side of the optical sheet 125, the display panel 110 may be located. An edge of the display panel 110 may be coupled to the first guide panel 117. That is, the display panel 110 may be supported by the first guide panel 117. An edge area of the front surface of the display panel 110 may be enclosed by the front cover 105. For example, the display panel 110 may be located between the first guide panel 117 and the front cover 105.

As shown in FIG. 4B, the display device 100 according to an exemplary embodiment of the present disclosure may further include a second guide panel 113. The optical sheet 125 may be coupled to the second guide panel 113. That is, the second guide panel 113 may be coupled to the frame 130, and the optical sheet 125 may be coupled to the second guide panel 113. The second guide panel 113 may be made of a material different from that of the frame 130. The frame 130 may enclose the first and second guide panels 117 and 113.

As shown in FIG. 4C, in the display device 100 according to an exemplary embodiment of the present disclosure, the front cover 105 may not cover a front surface of the display panel 110. That is, one end portion of the front cover 105 may be located at a side surface of the display panel 110.

Figure 5:
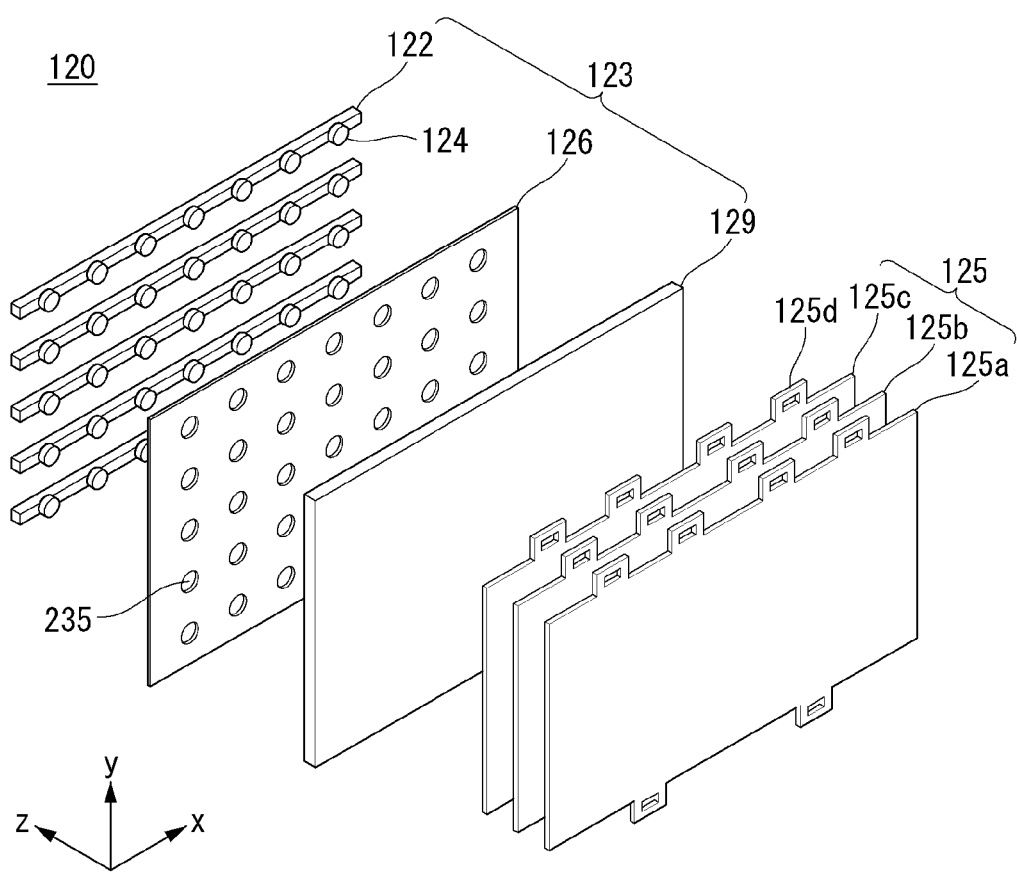
Figure 6:
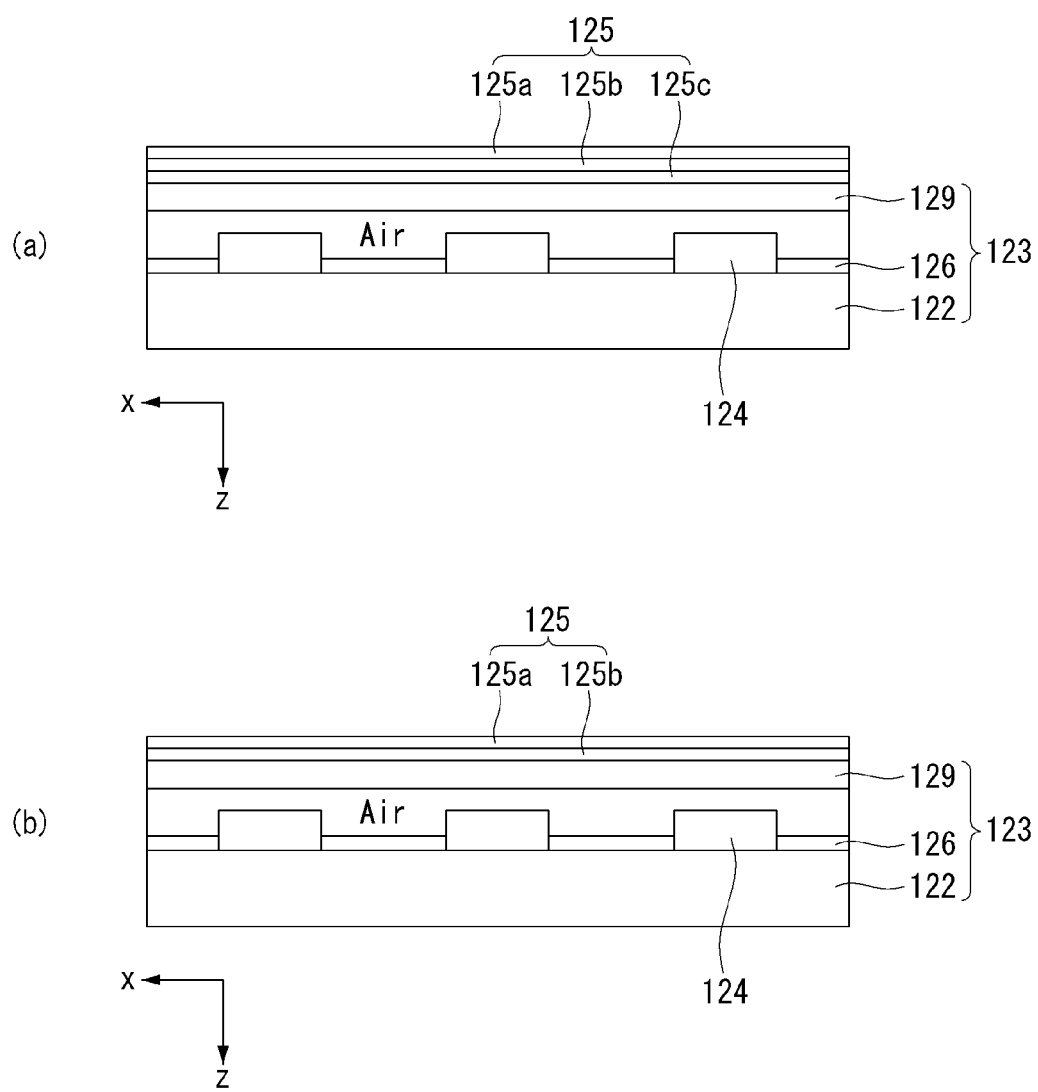

Referring to FIGS. 5 and 6, the backlight unit 120 may include a substrate 122, at least one light assembly 124, an optical layer 123 including a reflection sheet 126 and a diffusion plate 129, and an optical sheet 125 located at the front surface side of the optical layer 123.

The substrate 122 may be formed in a plurality of strap form extended in a first direction and separated at a predetermined gap in a second direction orthogonal to a first direction.

In the substrate 122, at least one light assembly 124 may be mounted. In the substrate 122, an electrode pattern for connecting an adaptor and the light assembly 124 may be formed. For example, in the substrate 122, a carbon nanotube electrode pattern for connecting the light assembly 124 and an adaptor may be formed. The substrate 122 may be made of at least one of polyethyleneterephthalate (PET), glass, polycarbonate (PC), and silicon. The substrate 122 may be a Printed Circuit Board (PCB) in which at least one light assembly 124 is mounted.

In the substrate 122, the light assembly 124 having a predetermined gap in a first direction may be disposed. A diameter of the light assembly 124 may be larger than a width of the substrate 122. That is, a diameter of the light assembly 124 may be larger than a second direction length of the substrate 122.

The light assembly 124 may be a light emitting diode (LED) chip or a light emitting diode package including at least one LED chip. The light assembly 124 may be formed with a color LED that emits at least one of colors such as red, blue, and green or a white LED. The color LED may include at least one of red LED, blue LED, and green LED.

A light source included in the light assembly 124 may be a Chip On Board (COB) type. The COB type light source may directly couple an LED chip, which is a light source to the substrate 122. Therefore, a process can be simplified. Further, resistance can be lowered and thus energy to be lost due to a heat can be reduced. That is, power efficiency of the light assembly 124 can be enhanced. The COB type light source can provide more bright lighting. The COB type light source may be implemented in a smaller thickness and a lighter weight than those of a conventional case.

At the front surface side of the substrate 122, the reflection sheet 126 may be located. The reflection sheet 126 may be located on an area, except for an area in which the light assembly 124 of the substrate 122 is formed. That is, in the reflection sheet 126, a plurality of through-holes 235 may be formed.

The reflection sheet 126 may reflect light emitted from the light assembly 124 to the front surface side. The reflection sheet 126 may reflect again light reflected from the light guide plate 129. The reflection sheet 126 may include at least one of a metal and metal oxide, which is a reflection material. For example, the reflection sheet 126 may include a metal and/or metal oxide having high reflectivity, as in at least one of aluminum (Al), silver (Ag), gold (Au), and titanium dioxide ($TiO_2$).

The reflection sheet 126 may be formed by depositing and/or coating a metal or metal oxide on the substrate. In the reflection sheet 126, ink including a metal material may be printed. In the reflection sheet 126, a deposition layer using a vacuum deposition method such as a heat deposition method, an evaporation method, or a sputtering method may be formed. In the reflection sheet 126, a coating layer and/or a print layer using a printing method, a gravure coating method, or a silk screen method may be formed.

An air gap may be located between the reflection sheet 126 and the diffusion plate 129. The air gap may perform a buffer function of widely spreading light emitted from the light assembly 124. A resin may be deposited on the light assembly 124 and/or the reflection sheet 126. The resin may perform a function of diffusing light emitted from the light assembly 124. The diffusion plate 129 may diffuse light emitted from the light assembly 124 upward.

The optical sheet 125 may be located at the front surface side of the diffusion plate 129. A rear surface of the optical sheet 125 may close contact with the diffusion plate 129, and a front surface of the optical sheet 125 may close contact with a rear surface of the display panel 110. The optical sheet 125 may include at least one sheet. Specifically, the optical sheet 125 may include at least one prism sheet and/or at least one diffusion sheet. A plurality of sheets included in the optical sheet 125 may be in a bonding state and/or a close contact state.

The optical sheet 125 may be formed with a plurality of sheets having different functions. For example, the optical sheet 125 may include first to three optical sheets 125a to 125c. The first optical sheet 125a may have a function of a diffusion sheet, and the second and third optical sheets 125b and 125c may have a function of a prism sheet. The number and/or a location of a diffusion sheet and a prism sheet may be changed. For example, the optical sheet 125 may include a first optical sheet 125a, which is a diffusion sheet and a second optical sheet 125b, which is a prism sheet.

The diffusion sheet prevents light emitted from the diffusion plate 129 from partially concentrating, thereby more uniformly enabling luminance of light. The prism sheet concentrates light emitted from the diffusion sheet to enable light to be vertically applied to the display panel 110.

The coupler 125d may be formed in at least one of corners of the optical sheet 125. The coupler 125d may be formed in at least one of the first to third optical sheets 125a to 125c. The coupler 125d may be formed at a corner of the long side of the optical sheet 125. The coupler 125d formed at the first long side and the coupler 125d formed at the second long side may be asymmetric. For example, a location and/or the number of the coupler 125d of the first long side and the coupler 125d of the second long side may be different.

Figure 7:
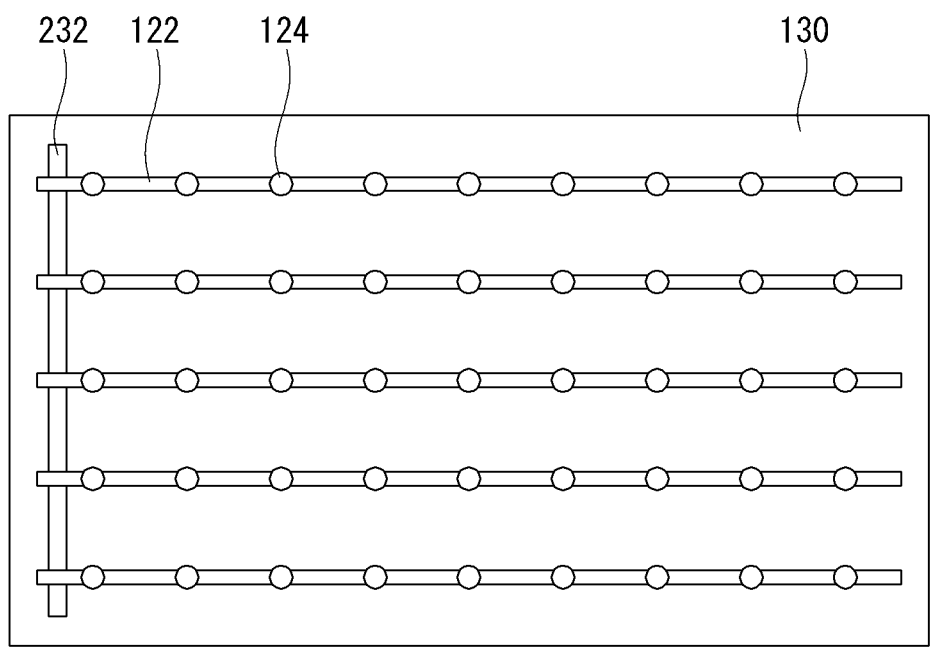

Referring to FIG. 7, the substrate 122 extended in a first direction and formed with a plurality of straps separated at a predetermined gap in a second direction orthogonal to the first direction may be provided on the frame 130. One side end of a plurality of substrates 122 may be connected to a wiring electrode 232.

The wiring electrode 232 may be extended in a second direction. The wiring electrode 232 may be connected to one side end of the substrate 122 at a constant gap in a second direction. The substrate 122 may be electrically connected to an adaptor (not shown) through the wiring electrode 232.

The light assembly 124 may be mounted at a predetermined gap in a first direction on the substrate 122. A diameter of the light assembly 124 may be larger than a width of a second direction of the substrate 122. Accordingly, an outer area of the light assembly 124 may be extended to an area in which the substrate 122 is not provided.

Figure 8:
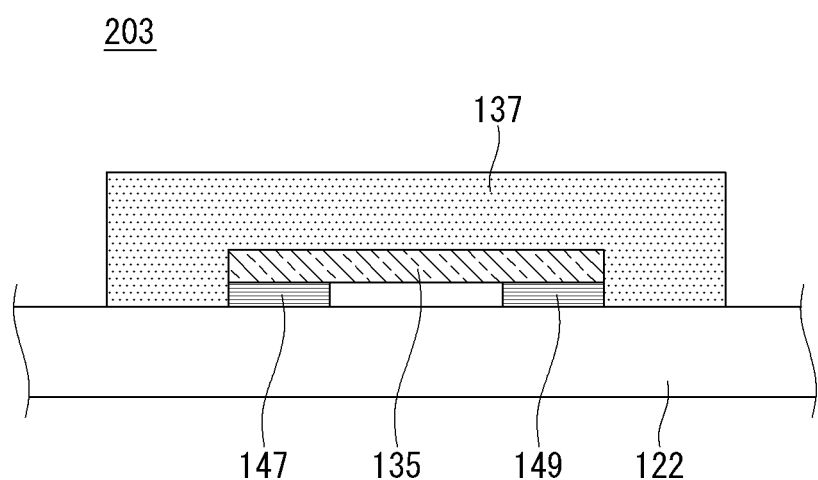
FIGS. 8 and 9 are views illustrating a light source according to an exemplary embodiment of the present disclosure.
Figure 9:
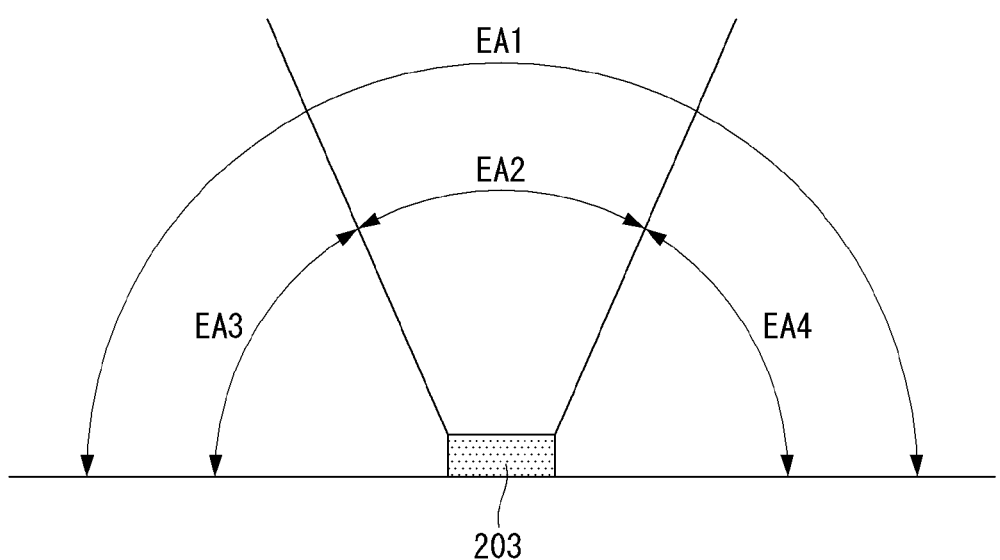

FIGS. 8 and 9 are diagrams illustrating a light source according to an exemplary embodiment of the present disclosure. As shown in FIG. 8, a light source 203 may be a COB type. The COB type light source 203 may include at least one of a light emitting layer 135, first and second electrodes 147 and 149, and a fluorescent layer 137.

The light emitting layer 135 may be located on the substrate 122. The light emitting layer 135 may emit any one color of blue, red, and green. The light emitting layer 135 may include any one Firpic, (CF3ppy) 2Ir (pic), 9, 10-di(2-naphthyl)anthracene (AND), Perylene, distyrybiphenyl, PVK, OXD-7, UGH-3(Blue) and a combination thereof.

The first and second electrodes 147 and 149 may be located at both sides of a lower surface of the light emitting layer 135. The first and second electrodes 147 and 149 may transfer a driving signal of the outside to the light emitting layer 135.

The fluorescent layer 137 may cover the light emitting layer 135 and the first and second electrodes 147 and 149. The fluorescent layer 137 may include a fluorescent material that converts light of spectrum that has occurred in the light emitting layer 135 to white light. In an upper portion of the fluorescent layer 137, a thickness of the light emitting layer 135 may be uniform. The fluorescent layer 137 may have a refractive index of 1.4 to 2.0.

The COB type light source 203 according to an exemplary embodiment of the present disclosure may be directly mounted on the substrate 122. Therefore, a size of the light assembly 124 can be reduced.

The light source 203 is located on the substrate 122 to have an excellent heat releasing performance and thus the light source 203 may be driven with a high current. Accordingly, the number of the light source 203 necessary for securing the same light quantity can be reduced. As the light source 203 is mounted on the substrate 122, a wire bonding process may be not required. Accordingly, due to simplification of a process, a cost can be saved.

As shown in FIG. 9, light emission of the light source 203 according to an exemplary embodiment of the present disclosure may be performed in a first light emitting range EA1. That is, light may be emitted in an area including a second light emitting range EA2, which is the front surface side and third and fourth light emitting ranges EA3 and EA4, which are the side surface side. This is different in that a conventional light source including a POB type emits light in a second light emitting range EA2. That is, the light source 203 according to an exemplary embodiment of the present disclosure may emit light in a wide range including a side surface of the light source 203.

Figure 10:
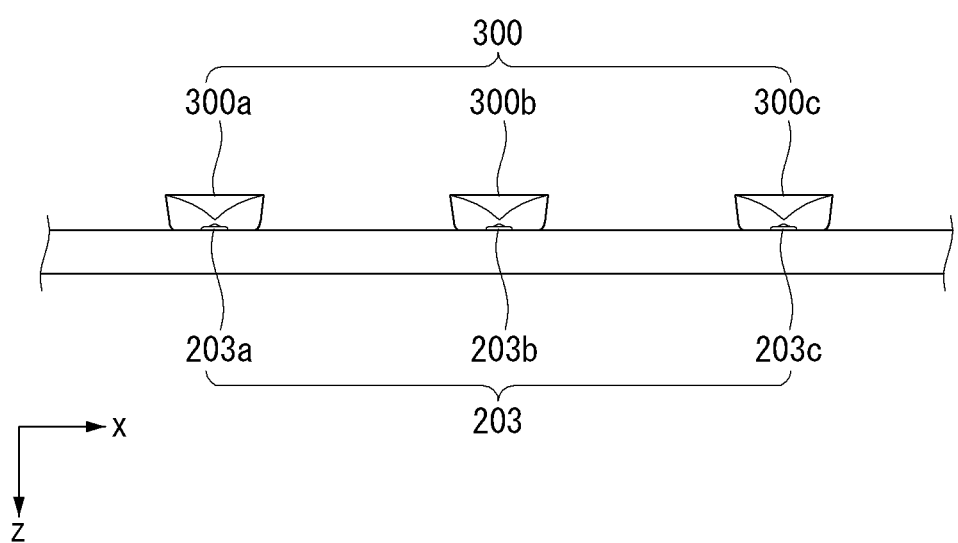
FIG. 10 is a diagram illustrating a light assembly including the light source of FIG. 9.

FIG. 10 is a diagram illustrating a light assembly including a light source of FIG. 9. The light assembly 124 according to an exemplary embodiment of the present disclosure may be separately disposed in the plural along the substrate 122. The light assembly 124 may include the light source 203 and a lens 300 located at one side of the light source 203. The light source 203 may be various sources that emit light. For example, the light source 203 may be the foregoing COB type LED.

The lens 300 may be located on the light source 203. At least a partial area of the light source 203 may be overlapped with the lens 300. For example, the light source 203 may be inserted into a groove of the inside of the lens 300. Alternatively, an area in which light is substantially emitted from the light source 203 may be inserted into the lower side of the lens 300. For example, when a bridge structure exists in the lens 300, a portion of the upper side of the light source 203 may be inserted into the lower side of the lens 300.

The lens 300 may reflect a portion of light emitted from the light source 203 and refract a portion thereof. For example, the lens 300 may be a reflective and refractive lens or a reflective lens. Light of the light source 203 may be omnidirectionally uniformly spread through reflection in a partial area of the lens 300 and/or refraction in a partial area thereof.

The light source 203 inserted into the lens 300 may close contact with the lens 300. For example, the lens 300 and the light source 203 may be bonded by an adhesive.

The lens 300 may correspond to each light source 203. For example, first to three lenses 300a to 300c may be located in an upper portion of the first to three light sources 203a to 203c.

The lens 300 may control a path of light emitted from the light source 203. That is, the lens 300 may enable light of the light source 203 not to concentrate at a specific point. In other word, the lens 300 may enable light of the light source 203 to uniformly diffuse. The lens 300 according to an exemplary embodiment of the present disclosure can control effectively a light path of the light source 230. The lens 300 according to an exemplary embodiment of the present disclosure can effectively control side surface light of the light source 230.

Figure 12:
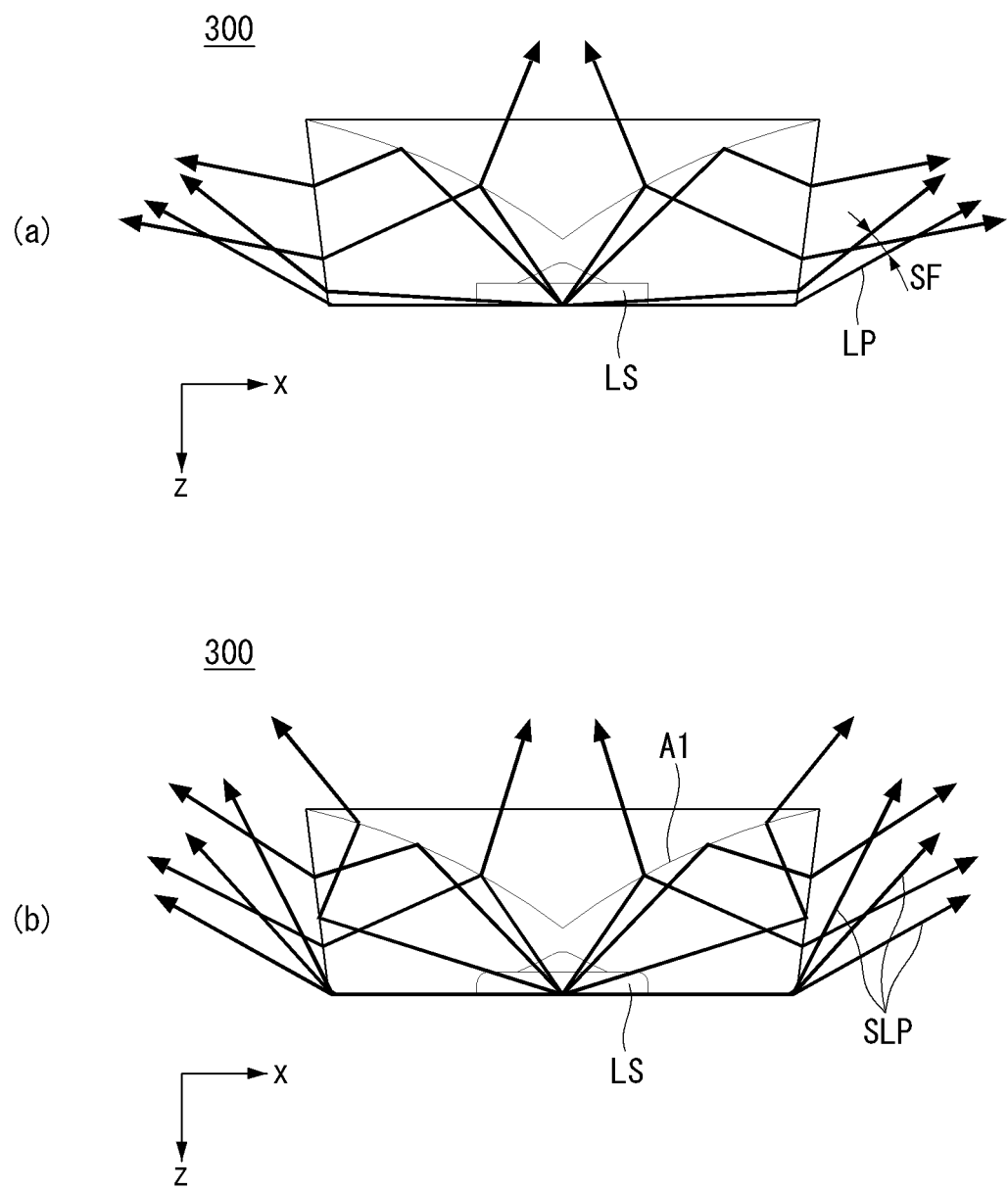

FIGS. 11 and 12 are diagrams illustrating a difference according to a lens constituting a light assembly. As shown in FIGS. 11 and 12, the light assembly 124 according to an exemplary embodiment of the present disclosure can effectively control a light path.

FIG. 11 is a diagram illustrating a brightness difference on the display panel 110 due to the control of a light path. As shown in FIG. 11A, when the control of a light path is ineffective, a Dark Area (DA) may be formed about a Light Spot (LS) corresponding to each light source 230. When brightness of the LS and a light and shade difference of the DA is large, an image quality may be deteriorated.

As shown in FIG. 11B, when a light path is effectively controlled, a light and shade difference between the DA and the LS corresponding to each light source 230 may be relatively small. That is, a difference of brightness felt through the display panel 110 may be small or may not exist.

As shown in FIG. 12A, the lens 300 may have an influence on a path of light (LP) emitted from the LS. When the lens 300 is a COB type light source, as described above, an amount of light emitted to a side surface of a light source may be larger than that of a conventional case. An LP of light emitted to a side surface of a light source may form a concentration area (SF). That is, when side surface light of a light source is not efficiently controlled, an LP of light may form an SF. The SF may make a light and shade difference about a light source.

As shown in FIG. 12B, the lens 300 according to an exemplary embodiment of the present disclosure can effectively control a path of light emitted from the LS. Particularly, the lens 300 according to an exemplary embodiment of the present disclosure can effectively control a path (SLP) of side surface light, which is light emitted from the LS to a side surface. For example, when light advancing toward a side surface exists, as in a COB type light source, by distributing an SLP of corresponding side surface light in various directions, a light and shade difference due to side surface light can be minimized.

As described above, the lens 300 may be a reflective and refractive lens or a reflective lens. For example, at least a portion of light emitted to the upper side of the lens 300 may be refracted or reflected by a shape of a first concave portion A1. By refraction or reflection due to the first concave portion A1, light may be uniformly radiated to the outside of the lens 300. The lens 300 of such a form may represent an effect different from that of a conventional lens type that generally uses refraction of light.

Figure 13:
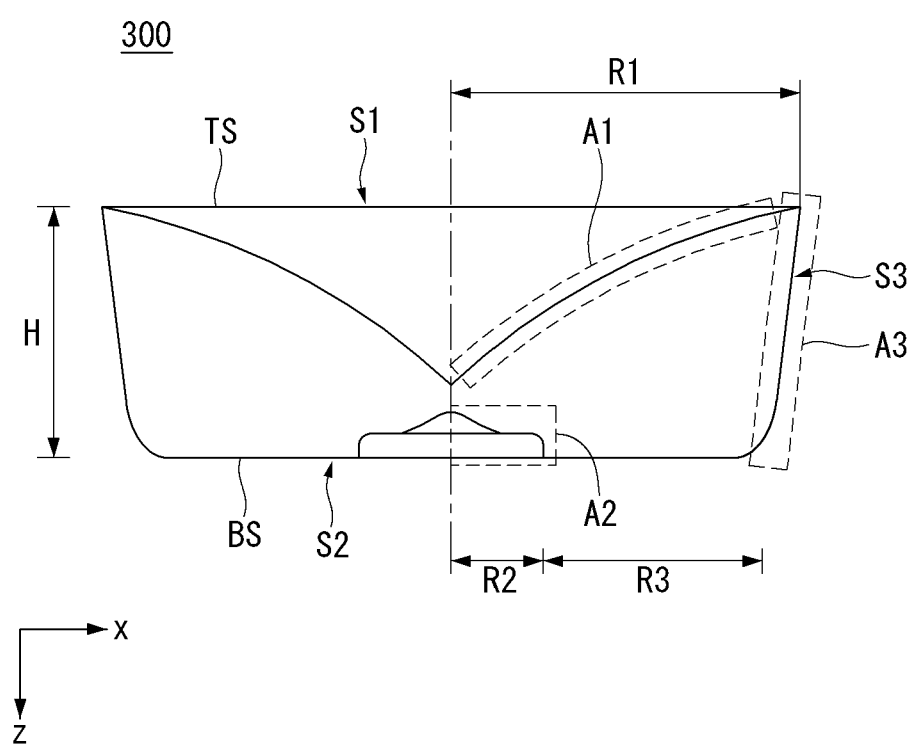

FIGS. 13 and 14 are diagrams illustrating a lens according to an exemplary embodiment of the present disclosure. The lens 300 according to an exemplary embodiment of the present disclosure may have a specific shape.

As shown in FIG. 13, the lens 300 may include a first surface S1, a second surface S2 opposite to the first surface S1, and a third surface S3 that connects the first surface S1 and the second surface S2.

The first surface S1 may be an upper side surface of the lens 300. At least a partial area of the first surface S1 of the lens 300 according to an exemplary embodiment of the present disclosure may have a depressed form. A depressed form on the first surface S1 may be formed in a curve form from the center of the lens 300 toward the outside. For example, a first concave portion A1 may be formed on the first surface S1.

An uppermost area of the first surface S1 may be a Top Surface (TS). The first surface S1 may have a circular cross-sectional shape. Light emitted to the upside of the light source 203 may be emitted upward through the first surface S1.

The second surface S2 may be a lower side surface of the lens 300. That is, the second surface S2 may be a surface opposite to the first surface S1, which is an upper side surface. At least a partial area of the second surface S2 of the lens 300 according to an exemplary embodiment of the present disclosure may have a depressed form. For example, a second concave portion A2 may be formed on the second surface S2.

A radius of the second concave portion A2 on the second surface S2 may be R2. A radius R2 of the second concave portion A2 may be 1.5-4 times greater than that of the light source 203 coupled to the lens 300.

A lowermost area of the second surface S2 may be a Bottom Surface (BS). The second surface S2 may have a circular cross-sectional shape. The light source 203 may be coupled to the second surface S2. As described above, a partial area of the light source 203 may be inserted into the second surface S2.

A radius of the second surface S2 may be R2+R3. A radius R1 of the first surface may be 1-3 times greater than a radius R2+R3 of the second surface S2. That is, a width of the TS may be greater than that of the BS. A radius R2+R3 of the second surface S2 may be 2-4 times greater than a radius R2 of the second concave portion A2.

The third surface S3 may be a surface that connects the first surface S1 and the second surface S2. That is, the third surface S3 of the lens 300 may be a side surface that connects an upper side surface and a bottom surface. A cross-sectional shape of the first surface S1 and the second surface S2 is a circle, and the third surface S3 forms an outer surface that connects the first and second surfaces S1 and S2, and thus the lens 300 may have an outline of a cylinder form of a height H. However, in a cylinder form, at least a partial area of the first to three surfaces S1 to S3 may be changed.

FIGS. 15 to 19 are diagrams illustrating a second area of the lens of FIG. 13. In order to effectively control a path of light emitted to a side surface, the second surface S2 of the lens 300 according to an exemplary embodiment of the present disclosure may have an intrinsic shape. That is, at the center of the second surface S2, the second concave portion A2 may be formed.

Figure 15:
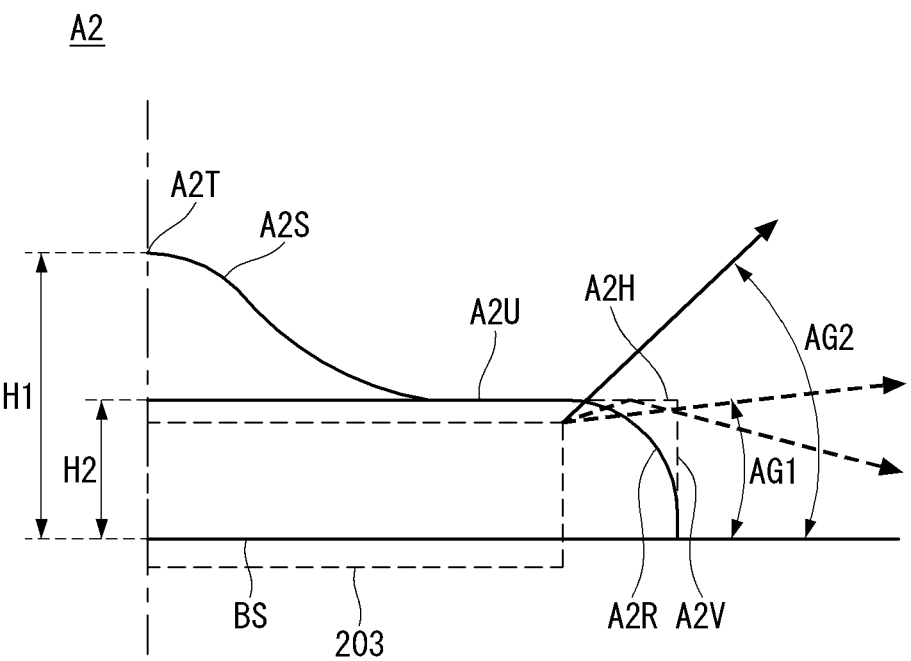
FIGS. 15 to 19 are diagrams illustrating a second area of the lens of FIG. 13.

FIG. 15 illustrates a half portion of the second concave portion A2 about the center of the lens 300. As shown in FIG. 15, the second concave portion A2 may include a central point A2T, a first area A2S obliquely extended in an outer circumference direction of the second surface S2 from the central point A2T, a second area A2U extended substantially parallel to the BS of the second surface S2 from the first area A2S, and a third area A2R extended from the second area A2U to the BS of the second surface S2.

The central point A2T may be a central point of the lens 300 and/or a central point of the second concave portion A2. The central point A2T may be a point in which a highest and/or deepest groove is formed in the second concave portion A2. The second concave portion A2 may have a form lowered from the central point A2T. The first area A2S may have a form in which a groove is lowered in an oblique form from the central point A2T. The second area A2U may be an area extended from the first area A2S. The second area A2U may be parallel to the BS. For example, the second area A2U may have a form in which a height H2 is maintained from the BS.

In the second area A2U, the first area A2S and/or the central point A2T, at least a portion of the light source 203 may be located. For example, an area in which light is emitted from the light source 203 may be overlapped with the inside of the lens 203.

The third area A2R may be a portion extended from the second area A2U. The third area A2R extended from the second area A2U may be extended to the BS. In the third area A2R, a curved surface of a central direction of the second surface A2 may be formed. That is, a boundary area of the second area A2U and the third area A2R may have a rounded form.

The third area A2R may be an area in which side surface light emitted from the light source 203 passes through. A round shape of the third area A2R may distribute side surface light emitted from the light source 203.

When the third area A2R is formed with a horizontal area A2H and a vertical area A2V of a straight line form, side surface light may be emitted to a path of a first distribution angle AG1. For example, light advancing relatively upward among light emitted from the light source 203 may be totally reflected by an inner side surface of the horizontal area A2H not to be emitted upward.

When the third area A2R is formed in a round shape according to an exemplary embodiment of the present disclosure, side surface light may be distributed along a round shape. That is, the third area A2R has a second distribution angle AG2 larger than the first distribution angle AG1, and in the third area A2R, light may be emitted to the outside. Because side surface light may be distributed, occurrence of light and shade due to concentration of light can be reduced.

Figure 16:
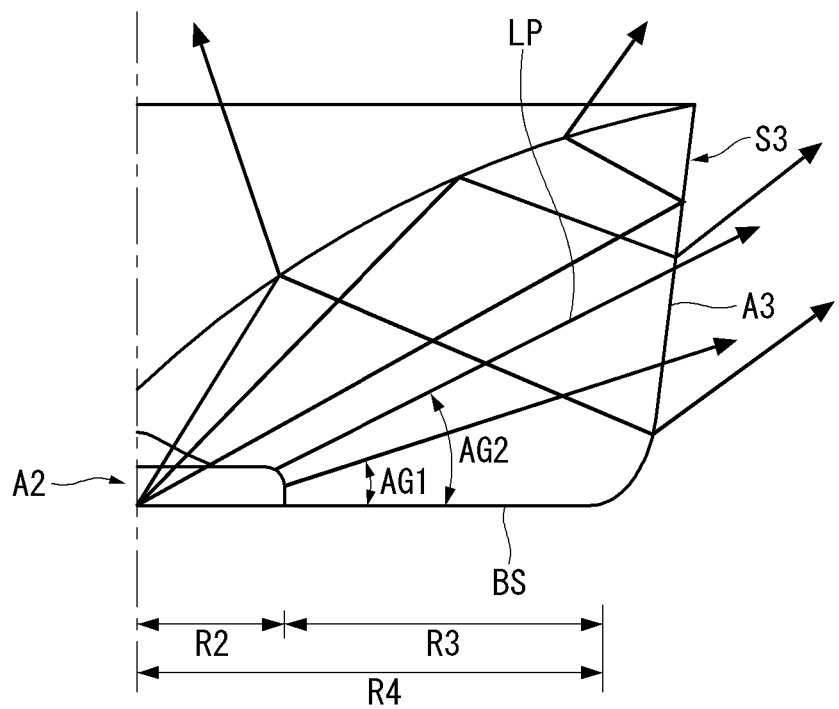

As shown in FIG. 16, due to a shape of the second concave portion A2, side surface light may be distributed. That is, side surface light may be distributed in a form of a second distribution angle AG2 wider than a conventional first distribution angle AG1. That is, a concentration phenomenon of light can be mitigated.

A bottom surface radius of the lens 300 may be R4. A radius of the second concave portion A2 may be R2. R4 may be 2-4 times greater than R2.

Figure 17:
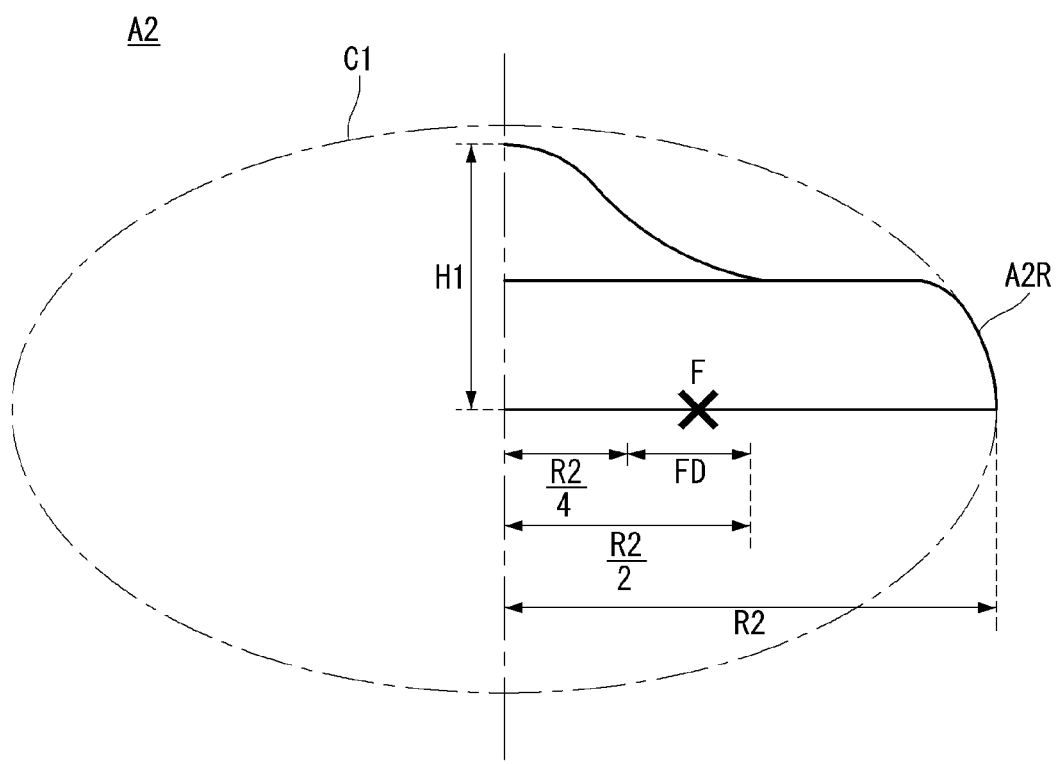
Figure 18:
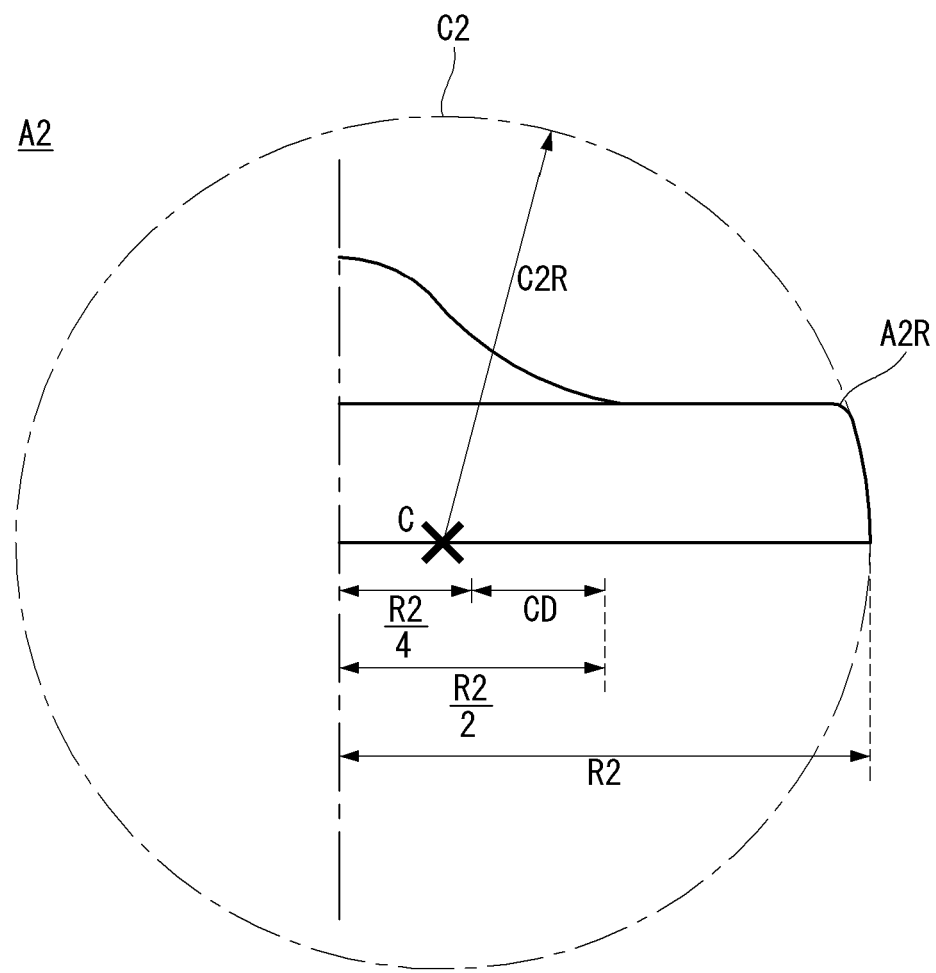

FIGS. 17 and 18 illustrate a shape of the third area A2R of the second concave portion A2. As shown in FIG. 17, the third area A2R may be a curved surface. The third area A2R of the curved surface may be formed along a trace of a circle. The third area A2R of the curved surface may be formed along a trace of an oval.

A first circle C1, which is an oval that determines a shape of the third area A2R may use a specific point as a focus F. For example, when a radius of the second concave portion A2 is R2, a focus F may be located between ½ and ¼ of R2. That is, the third area A2R may be formed along a trace of an oval in which a focus F exists at a specific point within a focus area (FD). A shape of the third area A2R may be changed according to a location of a focus F within the FD.

As shown in FIG. 18, the third area A2R may be determined by a shape of a circle using a portion between ½ and ¼ of R2, which is a radius of the second concave portion A2 as the central point C. That is, the third area A2R may be determined according to a shape of a circular arc of a virtual circle using a central point C as the center.

Figure 19:
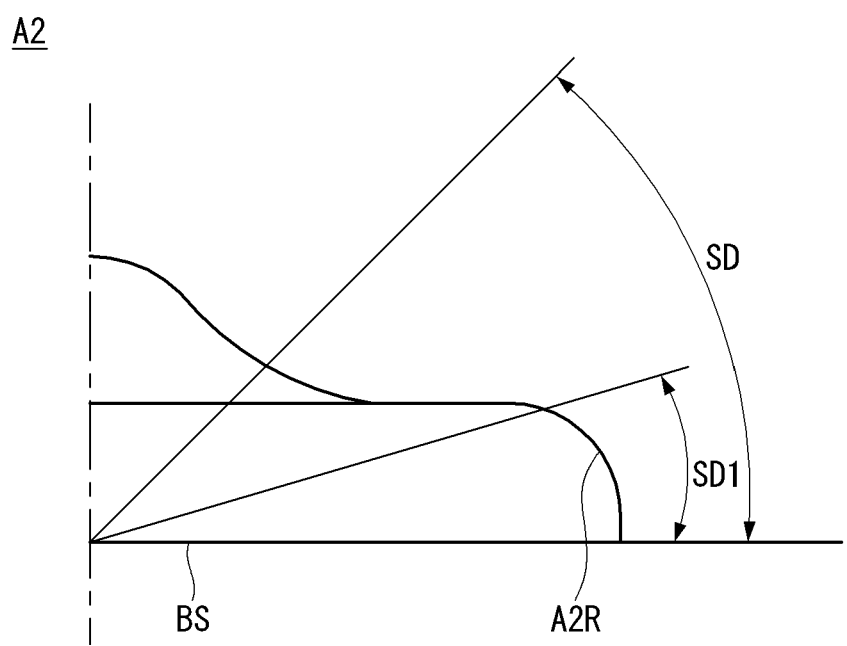

As shown in FIG. 19, the third area A2R may be located within a constant area from the BS. A predetermined area may be a portion within an angle SD from the BS. An angle SD may be 45°. For example, the third area A2R may be determined based on an angle SD1 between 0 and 45°.

Figure 20:
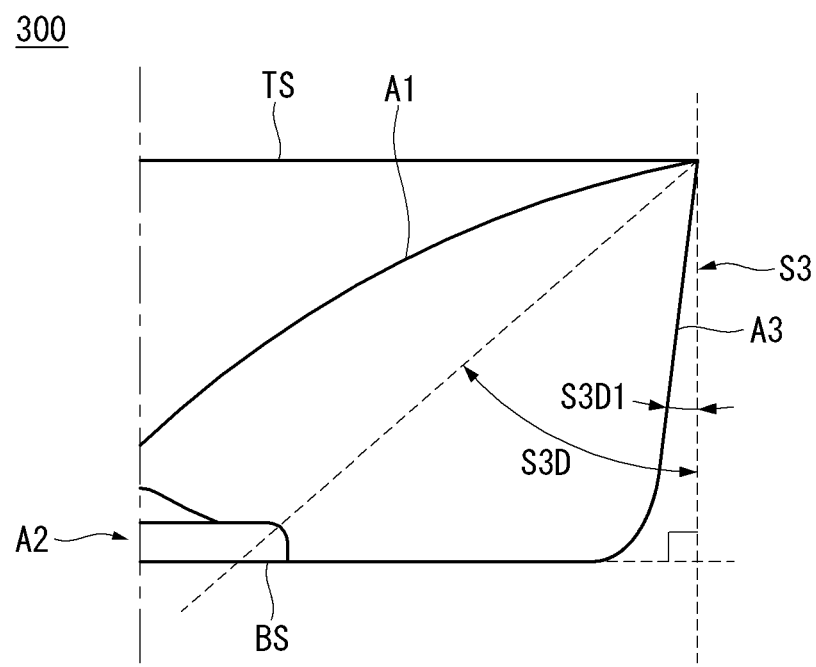
FIGS. 20 to 22 are diagrams illustrating a third surface of the lens of FIG. 13.
Figure 21:
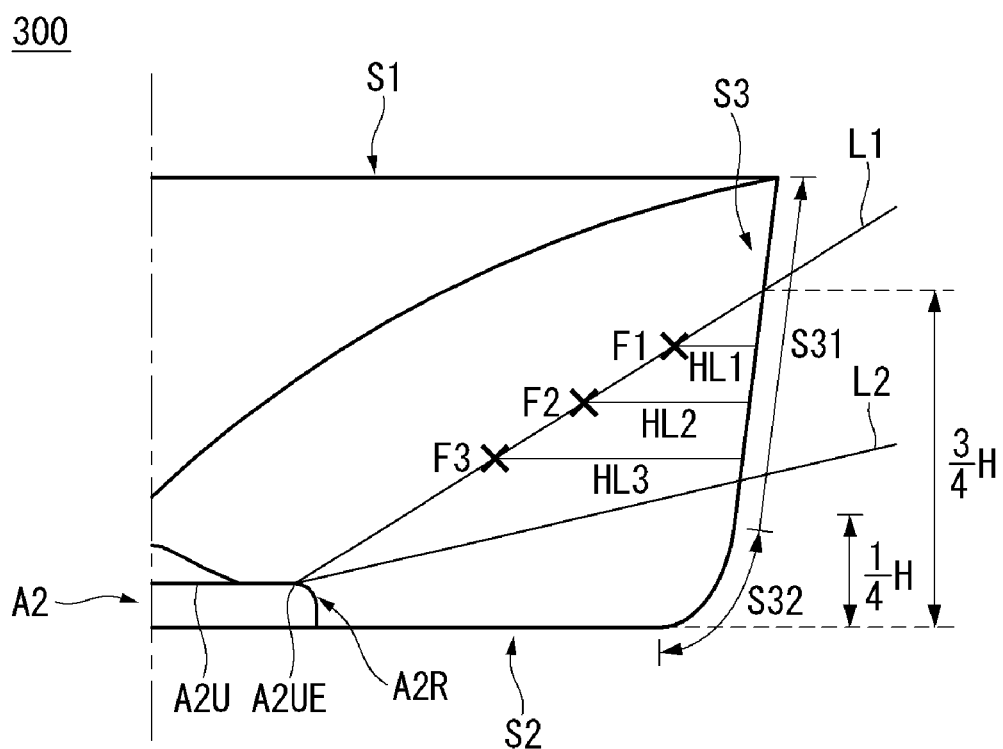
Figure 22:
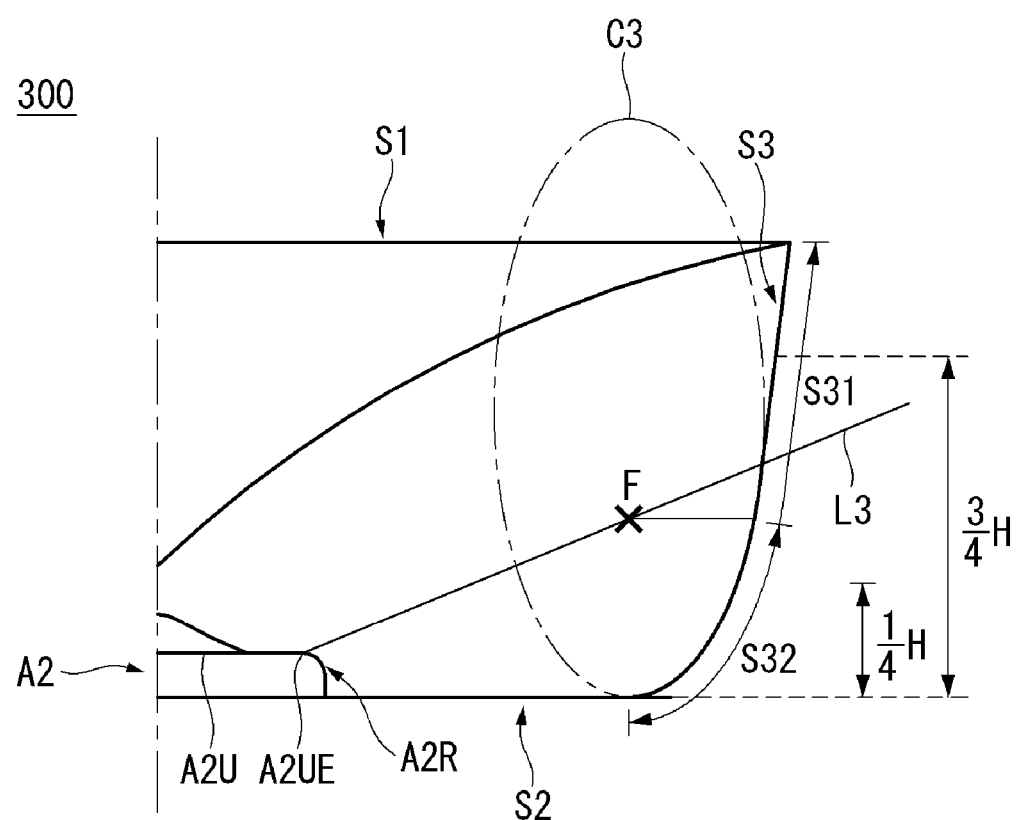

FIGS. 20 to 22 are diagrams illustrating a third surface of the lens of FIG. 13. The third surface S3 according to an exemplary embodiment of the present disclosure may exist within a predetermined area.

As shown in FIG. 20, the third surface S3 may be located between the TS and the BS. The third surface S3 may entirely be inclined by a constant angle from a vertical line. A constant angle may be in a range of an angle S3D from a vertical line starting at a boundary point TSE between the first surface S1 and the third surface S3. An angle S3D may be between 0° and 60°. For example, the third surface S3 may be formed according to an angle S3D1 smaller than an angle S3D.

As shown in FIG. 21, the third surface S3 may include a straight surface S31 and a curved surface S32. The straight surface S31 may be extended from the boundary point TSE to the second surface S2 side. The curved surface S32 may be located between the straight surface S31 and the second surface S2. That is, the curved surface S32 may be more adjacent to the second surface S2 rather than the straight surface S31.

The curved surface S32 may be formed at a location corresponding to a shape of a virtual circle or oval within a predetermined range. For example, an imaginary line L1 connecting between ¼ and ¾ of a height H of the lens 300 may be set using a boundary of the second area A2U and the third area A2R of the second concave portion A2 as a start point A2UE. At the third surface S3, virtual horizontal lines HL1, HL2, and HL3 may be set. The curved surface S32 may be set in a shape corresponding to an arc contacting a virtual oval using one of intersections F1, F2, and F3 of the imaginary line L1 and the horizontal lines HL1, HL2, and HL3 as a focus.

As shown in FIG. 22, the curved surface S32 contacting a portion of a virtual third oval C3 may be set using an intersection F as a focus. When changing at least one of the imaginary line L1, the horizontal lines HL1, HL2, and HL3, and the intersections F1, F2, and F3, a shape of the curved surface S32 may be changed.

A curvature of the curved surface S32 may be different from that of the third area A2R. That is, a curvature of a side surface of the second concave portion A2 and a curvature of a side surface of the third surface S2 may be different. As a curvature of the inside of the lens 300 and a curvature of the outside thereof are different, a path of light from a light source may be more diversified. That is, light from a light source is not concentrated to a specific point or area but may be uniformly diffused.

Figure 23:
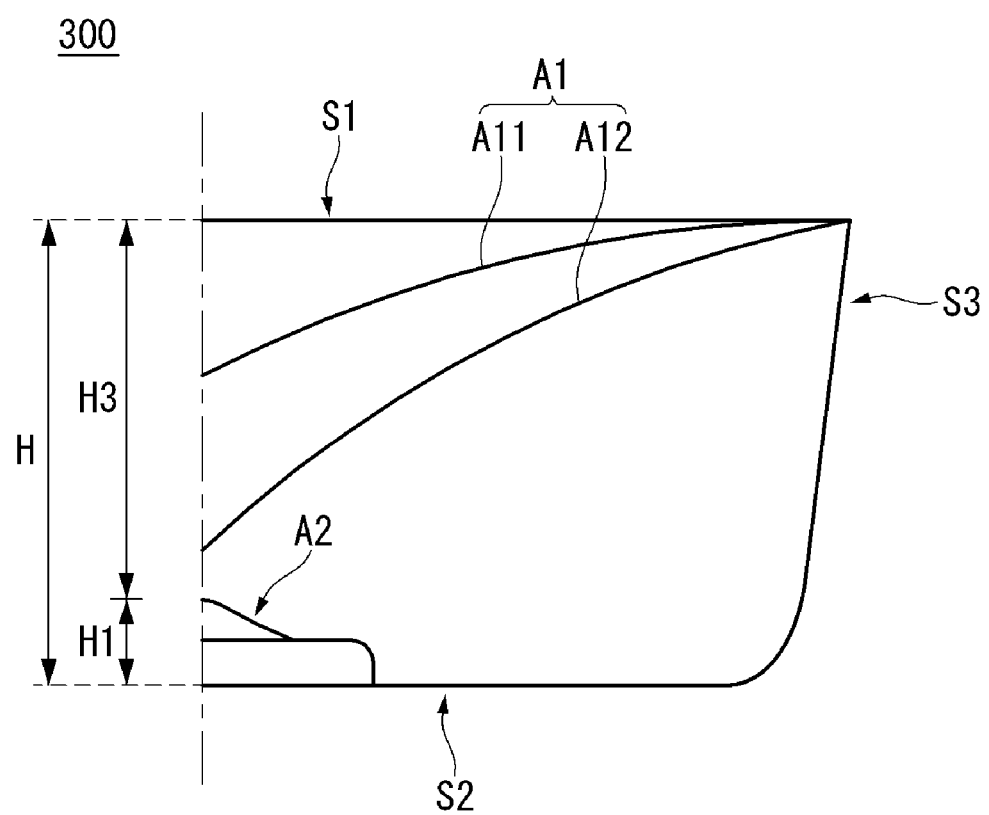
FIGS. 23 and 24 are diagrams illustrating a first area of the lens of FIG. 13.
Figure 24:
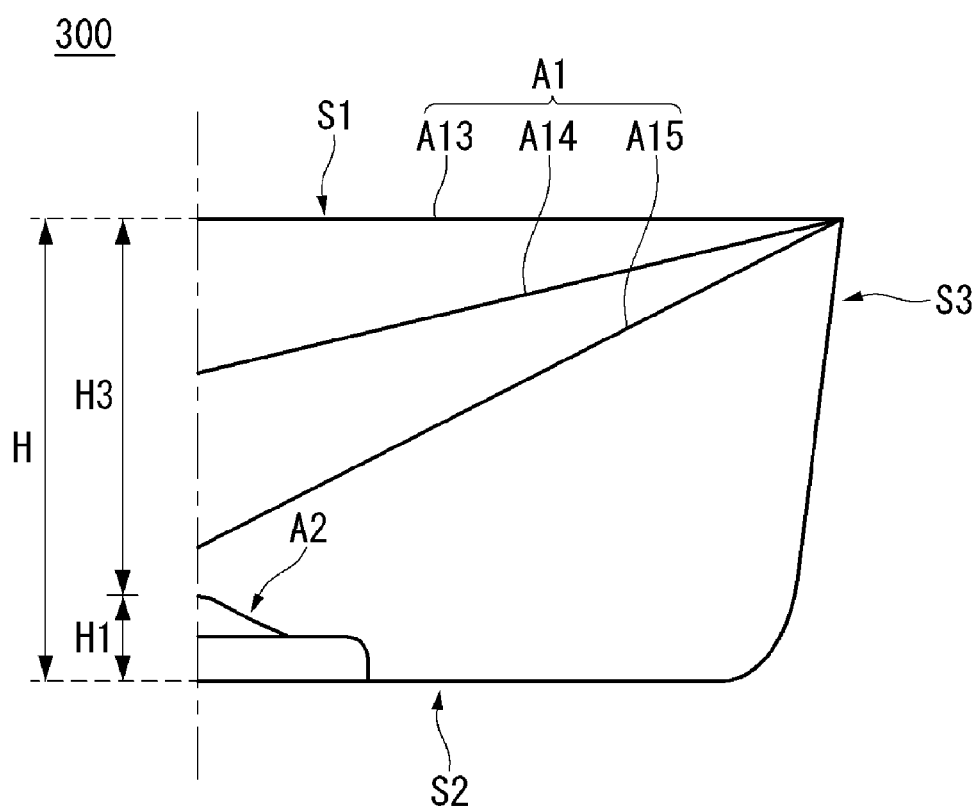

FIGS. 23 and 24 are diagrams illustrating a first area of the lens of FIG. 13. At the first surface S1 of the lens 300 according to an exemplary embodiment of the present disclosure, a first concave portion A1 may be formed.

The first concave portion A1 may have a form in which the first surface S1 is depressed in a direction of the second surface S2. For example, a central portion of the lens 300 may be most deeply depressed, and a depressed level of the lens 300 may be lowered as advancing to an outer circumference area.

When a height of the second area A2 formed in the lens 300 is H1, a maximum depressed point of the first concave portion A1 may be one of an area, except for H1. That is, at one point of a height H3, a maximum depressed point of the first concave portion A1 may exist.

The first concave portion A1 may have a curved surface form. For example, the first concave portion A1 may be provided in a form of a constant curved surface, as in a first-a concave portion A11 and a first-b concave portion A12.

As shown in FIG. 24, at the first surface S1 of the lens 300 according to an exemplary embodiment of the present disclosure, the first concave portion A1 of a straight line form may be formed. For example, the first surface S1 may have a form of a first-c to first-e concave portions A13 to A15 in which a depth constantly reduces from a maximum depressed point.

Figure 25:
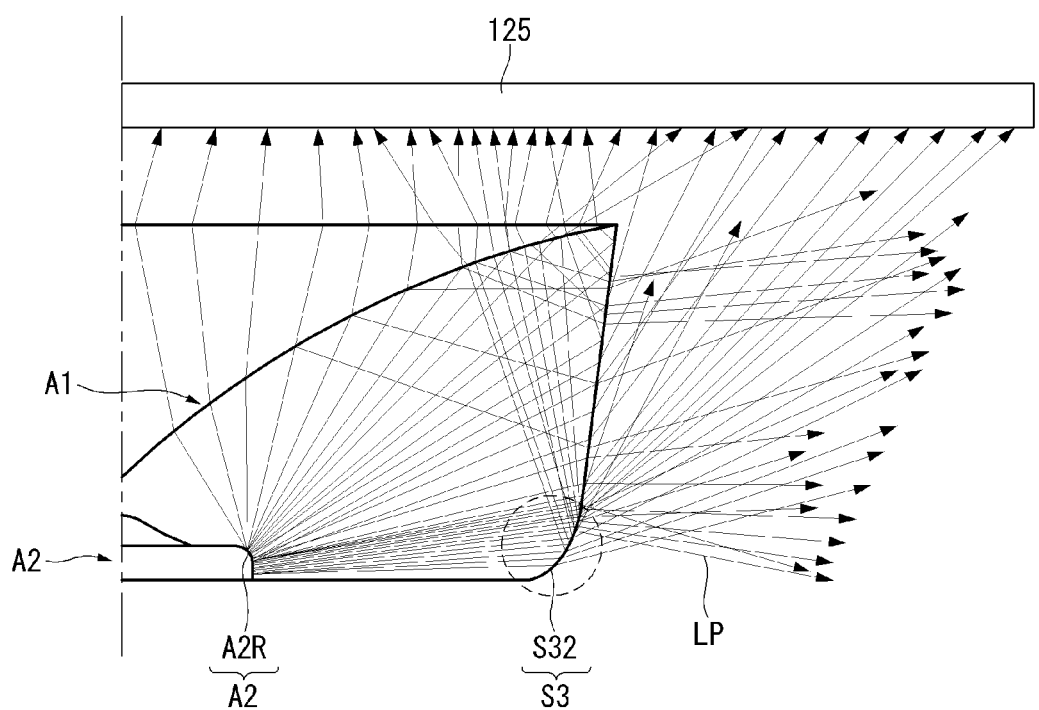
FIG. 25 is a diagram illustrating an example of a light path according to the lens of FIG. 13.

FIG. 25 is a diagram illustrating an example of a light path according to the lens of FIG. 13. The lens 300 according to an exemplary embodiment of the present disclosure controls an LP to enable uniform light to be transferred to the optical sheet 125. Particularly, the lens 300 according to an exemplary embodiment of the present disclosure may change an LP emitted to a side surface.

Light emitted to a side surface may be primarily diffused in the second concave portion A2. That is, as described above, due to a shape of the third area A2R of the second concave portion A2, an LP may be diffused.

An LP diffused at a side surface of the second concave portion A2 may be diffused again via the curved surface S32 of the third surface S3. At least a portion of the LP that has passed through the second concave portion A2 may be refracted and/or reflected in the first concave portion A1. Therefore, a phenomenon that an LP is concentrated to a specific point can be prevented and light may be resultantly uniformly distributed on the optical sheet 125.

FIGS. 26 to 31 are diagrams illustrating a lens according to other exemplary embodiments of the present disclosure. The present disclosure may include a form of the lens 300 of various exemplary embodiments.

Figure 26:
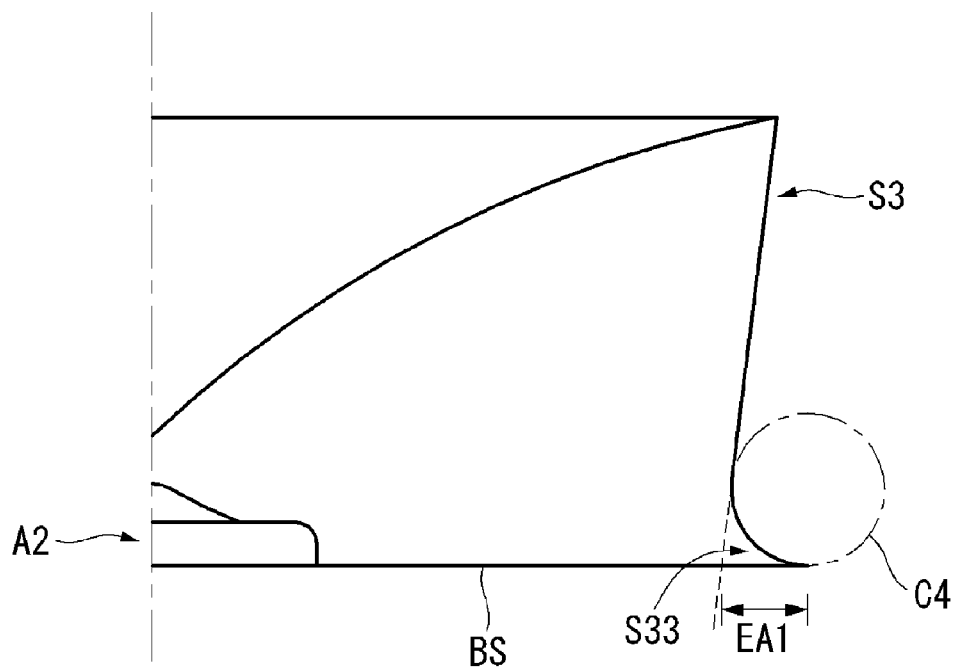
FIGS. 26 to 31 are diagrams illustrating a lens according to other exemplary embodiments of the present disclosure.

As shown in FIG. 26, a curved surface S33 of the third surface S3 may be protruded to the outside of the lens 300. For example, the curved surface S32 corresponding to a virtual fourth circle C4 contacting an outer surface of the third surface S3 may be formed. The curved surface S33 may be extended by EA1 from the second surface S2.

Figure 27:
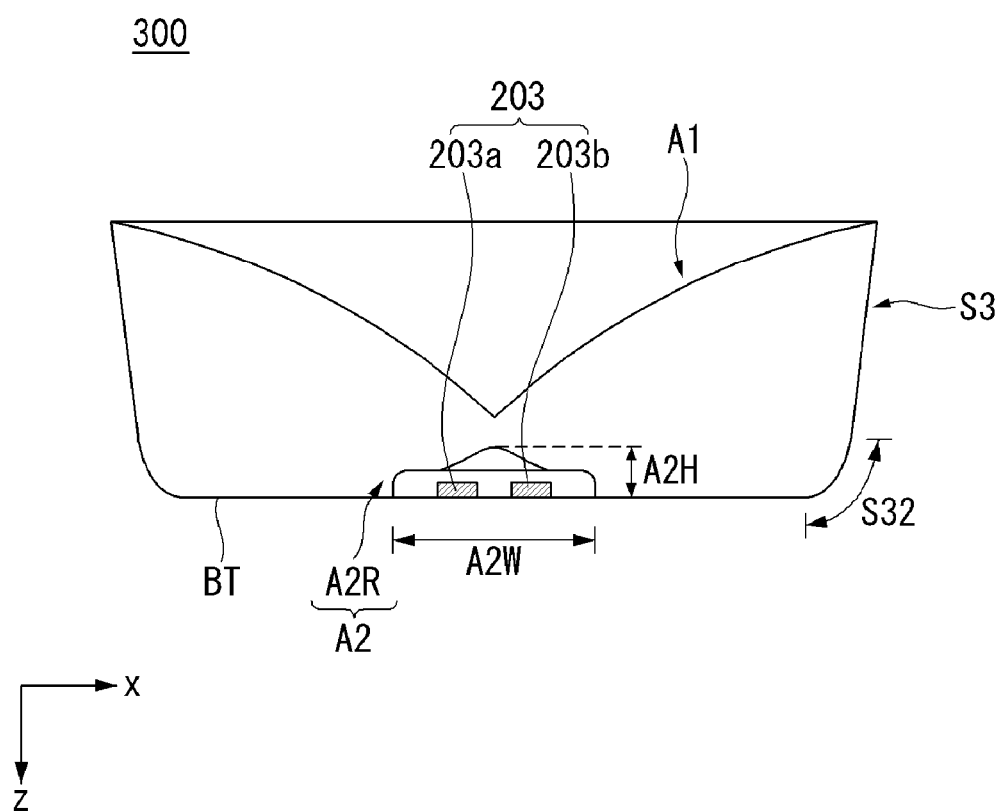

As shown in FIG. 27, a plurality of light sources 203 may correspond to one lens 300. For example, the first and second light source 203A and 203B may be located within the second concave portion A2.

The light source 203 may have a relatively small size. The light source 203 may have a performance of a high output. Therefore, the first and second light sources 203a and 203b may correspond to one lens 300.

The second concave portion A2 may have an oval shape. For example, a width A2W of the second concave portion A2 may be larger than a height A2H. At a space secured by forming the second concave portion A2 in an oval shape, a plurality of light sources 203a and 203b may be located.

When a plurality of light sources 230 are located within the second concave portion A2, a shape of the second concave portion A2 and/or the curved surface S32 of the third surface S3 according to an exemplary embodiment of the present disclosure may perform an important function. That is, as a large amount of side surface light occurs in the first and second light sources 203a and 203b, a more effective side surface light control may be required. According to the present disclosure, side surface light can be effectively distributed through the curved third area A2R of a side surface of the second concave portion A2 and/or the curved surface S32 of the lower side of the third surface S3.

Figure 28:
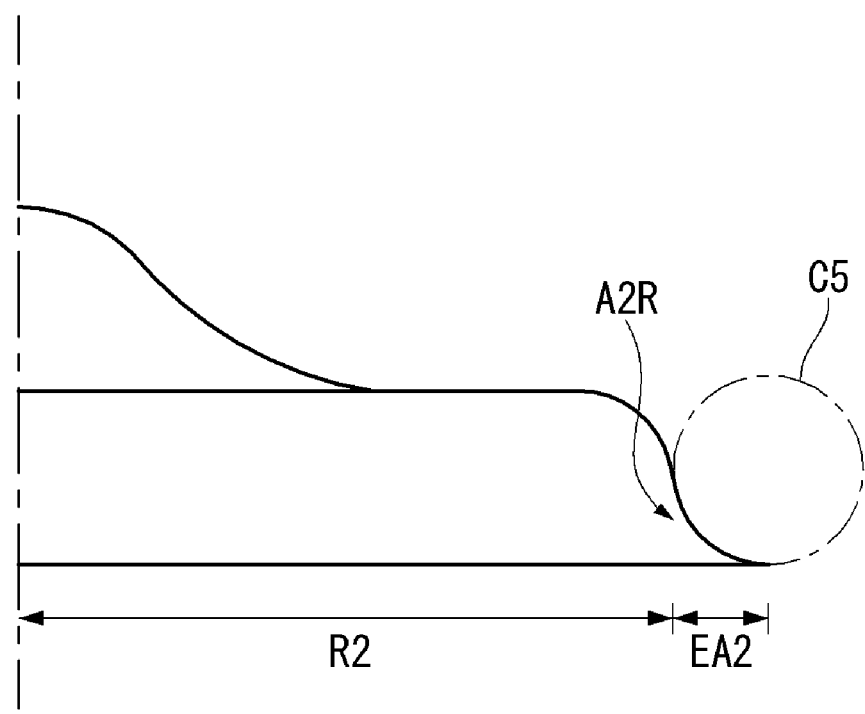

As shown in FIG. 28, the third area A2R of the second concave portion A2 may have a form of a curved surface protruded to the outside. For example, the third area A2R may have a form of a curved surface corresponding to a fifth circle C5 contacting the third area A2R at the outside of the second concave portion A2. In such a case, a length of the second concave portion A2 may be extended by EA2.

Figure 29:
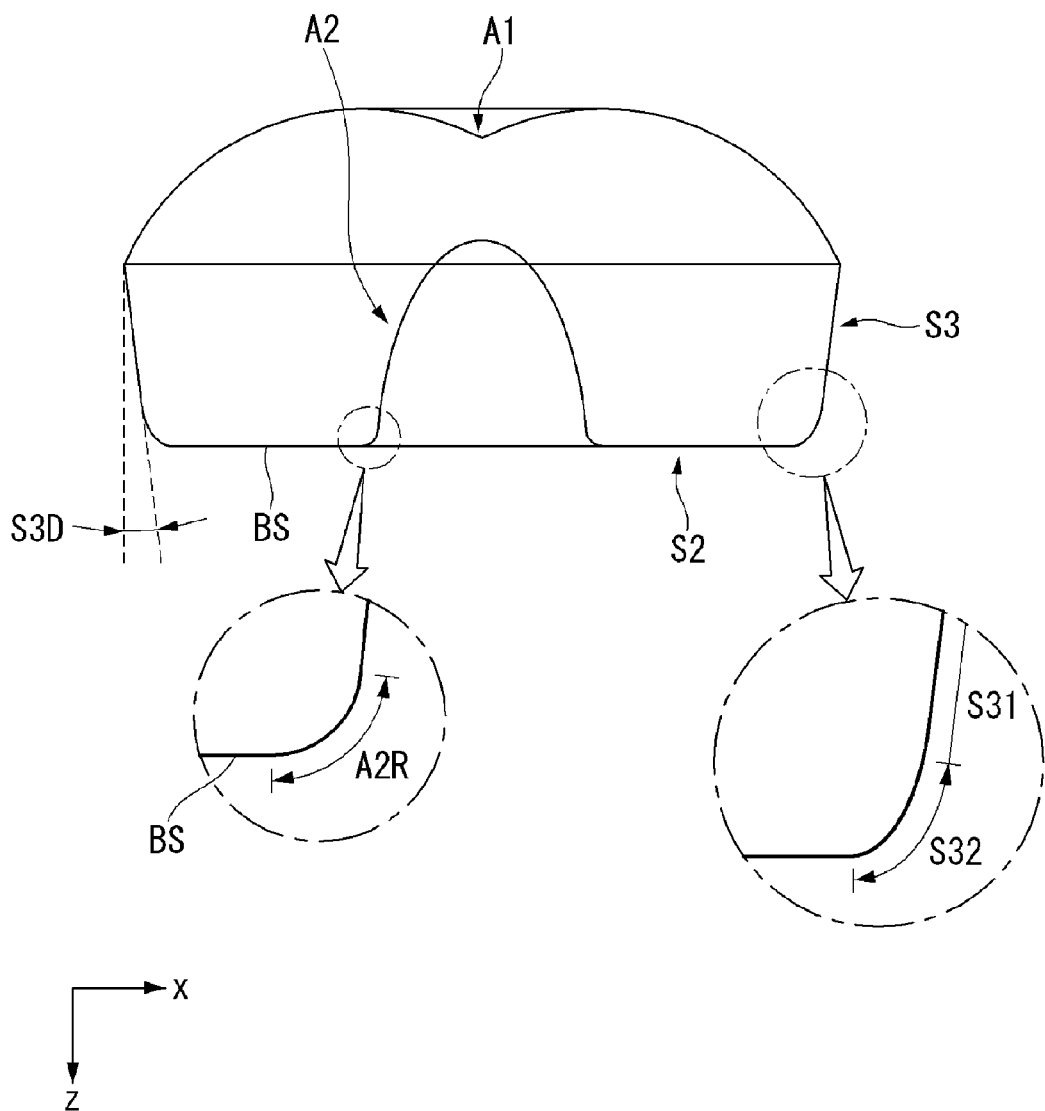
Figure 30:
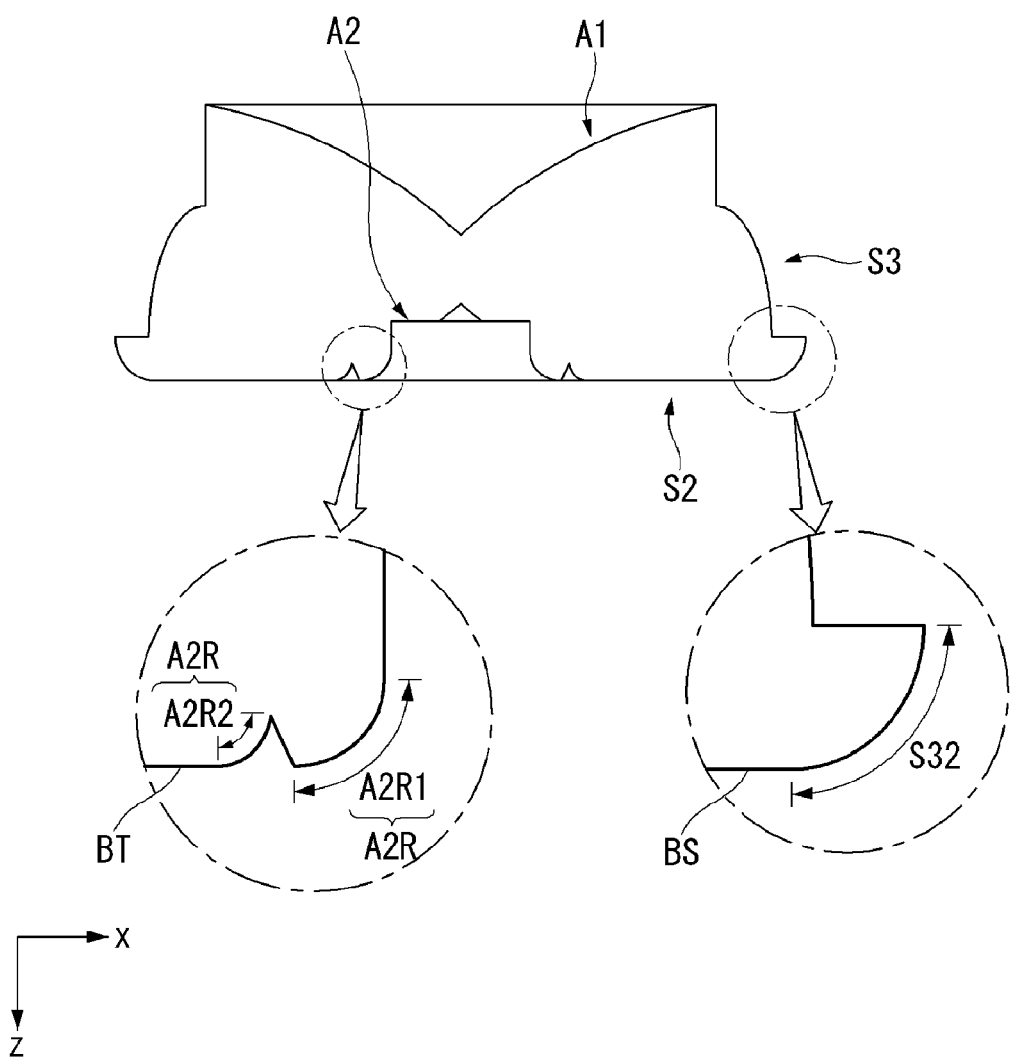
Figure 31:
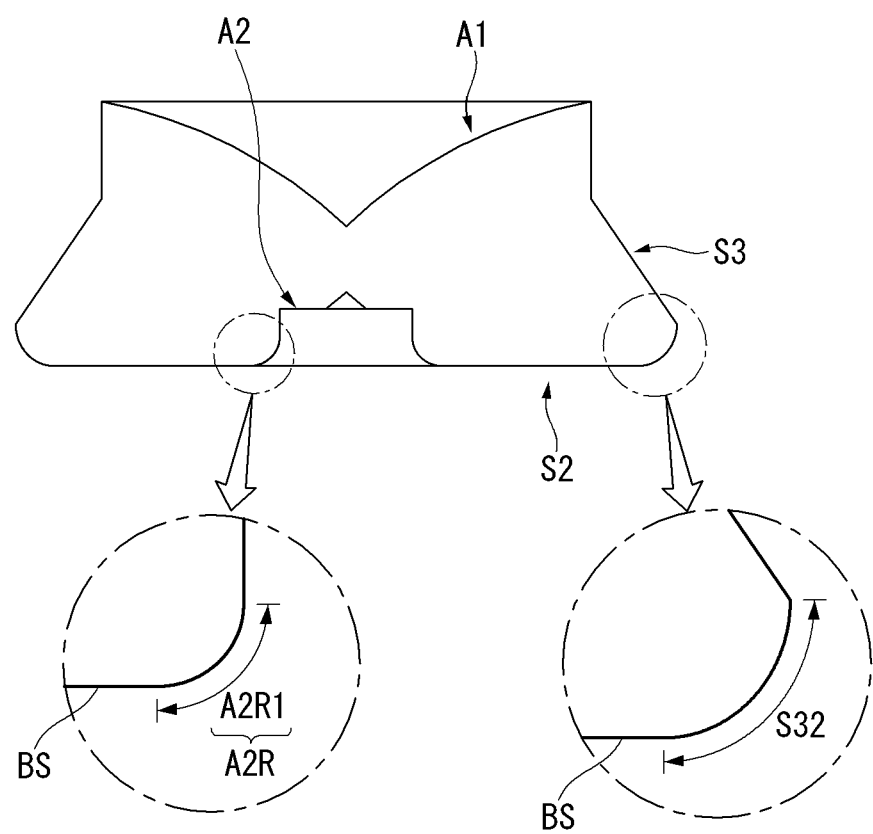

As shown in FIGS. 29 to 31, the present disclosure may be applied even to the lens 300 of other forms. As shown in FIG. 29, the third surface S3 may be inclined in a constant angle. For example, the third surface S3 may be inclined inwards by an angle S3D from a vertical line. The third surface S3 may include a straight surface S31 and a curved surface S32. The curved surface S32 may be connected to the second surface S2 side.

In the second concave portion A2, the third area A2R may be formed. That is, in an area formed at the lower side of the second concave portion A2 to be extended to the BS, a curved surface may be formed. As the third area A2R exists, light emitted from the light source may be diffused. Particularly, uniformity of light emitted from a side surface of the light source can be improved.

As shown in FIG. 30, in a portion in which the third surface S3 and the BS of the lens 300 contact, a constant curved surface S32 may be formed. In the second concave portion A2, the third areas A2R1 and A2R2 may be formed. That is, in a portion of an area in which the second concave portion A2 and the BS contact, a curved surface may be formed. The third areas A2R1 and A2R2 may include a third-a A2R1 and a third-b A2R2. That is, in an area contacting the BS, a plurality of curved surfaces may be formed.

As shown in FIG. 31, in an area in which the third surface S3 and the BS of the lens 300 contact, the curved surface S32 may be formed. In the second concave portion A2, the third area A2R, which is a curved surface may be formed.

FIGS. 32 and 33 are diagrams illustrating a disposition of a light assembly according to other exemplary embodiments of the present disclosure. The light assembly 124 may be disposed on the frame 130. The light assembly 124 may be disposed in various forms according to a location. The light assembly 124 may include the lens 300 of at least one of the foregoing forms. Therefore, light and shade or a hot spot phenomenon can be prevented from occurring about the lens 300.

As shown in FIG. 32A, the light assembly 124 may be disposed on the frame 130. Alphabet indicates respective light assemblies 124. That is, the light assembly 124 may horizontally and vertically be disposed. The light assembly 124 may be a light assembly 124 of a form A. For example, the light assembly 124 including the lens 300 of a specific form may be disposed.

As shown in FIG. 32B, the light assembly 124 may have a form A and a form B. For example, the light assembly 124 including the lens 300 of two forms may be disposed. In this case, at the outermost side of an array of the light assembly 124, the light assembly 124 of a form B may be disposed, and at the inside thereof, the light assembly 124 of a form A may be disposed.

Unlike the inside, at the outermost side of an array of the light assembly 124, the light assembly 124 is not disposed. Therefore, for uniform distribution of light, the light assembly 124 disposed at the outermost side may include the lens 300 of a form different from that of the inside.

As shown in FIGS. 33A and 33B, the light assembly 124 may have a form in which at least two forms are alternately disposed. For example, the light assembly 124 including the lens 300 of a form A may be horizontally or vertically disposed in one line, and the light assembly 124 including the lens 300 of a form B may be horizontally or vertically disposed in one line.

The present disclosure provides an optical lens that can effectively control a light path and a backlight unit including the same.

An exemplary embodiment of the present disclosure provides an optical lens including: a first surface having a circular cross-sectional shape; a second surface opposite to the first surface; and a third surface configured to connect the first surface and the second surface, wherein the third surface includes at least a partial straight surface extended from a boundary of the first surface and at least a partial curved surface extended from the straight surface to the second surface at a path between the first surface and the second surface.

The straight surface may be formed from a boundary of the first surface and the third surface, and the curved surface may be formed from an end portion of the straight surface to a boundary of the second surface.

The second surface may include a concave portion in which a central area thereof is depressed in a direction of the first surface.

The concave portion may include: a first area obliquely extended in an outer circumference direction of the second surface from a central point of the second surface, which is a maximum depressed point of the first concave portion, a second area extended substantially parallel to the second surface from the first area; and a third area extended from the second area to the second surface.

The third area may include the at least a partial curved surface.

The curved surface may be bent in a central direction of the second surface.

The first surface may include a concave portion depressed in a direction of the second surface.

The concave portion may be formed from a central point of the first surface, which is a maximum depressed point of the concave portion to a boundary of the first surface and the third surface.

The concave portion may form a curved surface having a decreasing depth gradually depressed from a central point of the first surface, which is a maximum depressed point of the concave portion to a boundary of the first surface and the third surface.

A radius of the first surface may be larger than that of the second surface.

The light source may be located at the second surface side.

Another embodiment of the present disclosure provides a backlight unit including: an optical sheet; a substrate separately disposed at a predetermined distance from the optical sheet; and a light assembly disposed on the substrate, wherein the light assembly includes: a light source; and an optical lens located at one side of the light source and including a first surface having a circular cross-sectional shape, a second surface opposite to the first surface, and a third surface configured to connect the first surface and the second surface, wherein the third surface includes at least a partial straight surface extended from a boundary of the first surface and at least a partial curved surface extended from the straight surface to the second surface at a path between the first surface and the second surface.

The substrate may be disposed on the frame and may be disposed in at least one line in at least one direction of a horizontal direction and a vertical direction of the frame.

The light assembly may exist in the plural, and the lens included in the plurality of light assemblies may have the same form.

The light assembly may exist in the plural, and at least two of the lenses included in the plurality of light assemblies may have different forms.

According to at least one of exemplary embodiments of the present disclosure, a light path can be effectively controlled.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical lens, comprising:
a first surface having a circular cross-sectional shape;
a second surface positioned lower than the first surface, the second surface including:
   a bottom surface that is flat; and
   a concave recess recessing toward the first surface from the bottom surface, the concave recess being laterally surrounded by the bottom surface; and
   a third surface configured to connect the first surface and the second surface,
wherein the third surface includes:
   a straight surface extending from a boundary of the first surface; and
   a first curved surface that is bent and extended toward a center of the second surface from the straight surface, the first curved surface being convex outward,
wherein the straight surface and the first curved surface are extended in a path between the first surface and the second surface,
wherein the wherein the concave recess includes:
   a first area obliquely extending toward an outer circumference of the bottom surface from a center of the concave recess, the center having a maximum depth toward the first surface;
   a second area extending from the first area, the second area being parallel to the bottom surface; and
   a third area extending from the second area to the bottom surface, the third area being concave outward, and
wherein a boundary between the straight surface and the first curved surface is convex outward.

2. The optical lens of claim 1, wherein the straight surface is formed from a boundary of the first surface and the third surface, and the first curved surface is formed from an end portion of the straight surface to a boundary of the second surface.

3. The optical lens of claim 1, wherein the third area includes a second curved surface that is concave outward.

4. The optical lens of claim 1, wherein the first surface includes a concave surface recessing toward the second surface.

5. The optical lens of claim 4, wherein the concave surface extends to a boundary of the first and third surfaces and has a maximum depth toward the second surface at a central point of the first surface.

6. The optical lens of claim 4, wherein the concave recess forms a curved surface having a depth gradually decreasing from a central point of the first surface to a boundary of the first surface and the third surface.

7. The optical lens of claim 3, wherein light that passes through the second curved surface changes a path as the light passes through the first curved surface.

8. The optical lens of claim 1, wherein a first radius of the first surface is larger than a second radius of the second surface.

9. A display device, comprising:
a display panel;
an optical sheet positioned at a rear of the display panel;
a substrate positioned at a rear of the optical sheet; and
a light assembly on the substrate, the light assembly including a light source and a first optical lens,
wherein the light source provides the optical sheet with light,
wherein the first optical lens covers the light source,
wherein the first optical lens includes a first surface having a circular cross-sectional shape, a second surface opposite to the first surface, and a third surface configured to connect the first surface and the second surface,
wherein the second surface includes:
   a bottom surface this is flat and faces the substrate; and
   a concave recess recessing toward the first surface from the bottom surface, the concave recess being laterally surrounded by the bottom surface,
wherein the third surface includes a straight surface extended from a boundary of the first surface and a first curved surface bent and extended toward a center of the second surface from the straight surface,
wherein the straight surface and the first curved surface are extended in a path between the first surface and the second surface, and
wherein the first curved surface is convex outward,
wherein the concave recess includes:
   a first area obliquely extending toward an outer circumference of the bottom surface from a center of the concave recess, the center having a maximum depth toward the first surface, and the first area obliquely facing the substrate;
   a second area extending from the first area, the second area being parallel to the bottom surface; and
   a third area extending from the second area to the bottom surface, the third area being concave outward and obliquely facing the substrate, and
wherein a boundary between the straight surface and the first curved surface is convex outward.

10. The display device of claim 9, wherein the substrate comprises a plurality of substrates, each of the substrates extending in a horizontal direction and separated from each other in a vertical direction.

11. The display device of claim 9, wherein the light assembly comprises a plurality of light assemblies.

12. The display device of claim 9, wherein the light assembly comprises a plurality of light assemblies, at least one of the light assembly having a second optical lens different from the first optical lens.

13. The display device of claim 9, wherein the straight surface is formed from a boundary of the first surface and the third surface, and the first curved surface is formed from an end portion of the straight surface to a boundary of the second surface.

14. The display device of claim 9, wherein the third area includes a second curved surface that is concave outward.

15. The display device of claim 9, wherein a boundary between the straight surface and the first curved surface is convex outward.

16. The display device of claim 9, wherein a concave surface of the first surface extends to a boundary of the first and third surfaces and has a maximum depth toward the second surface at a central point of the first surface.

17. The display device of claim 9, wherein the concave recess forms a curved surface having a depth gradually decreasing from a central point of the first surface to a boundary of the first surface and the third surface.

18. The display device of claim 14, wherein light that passes through the second curved surface changes a path as the light passes through the first curved surface.

19. The display device of claim 9, wherein a first radius of the first surface is larger than a second radius of the second surface.

* * * * *